United States Patent

Smith et al.

[15] 3,647,348

[45] Mar. 7, 1972

[54] HARDWARE-ORIENTED PAGING CONTROL SYSTEM

[72] Inventors: William R. Smith, Mountain View; Rex Rice, Menlo Park; Stanley Mazor, Sunnyvale, all of Calif.

[73] Assignee: Fairchild Camera and Instrument Corporation, Syosset, Long Island, N.Y.

[22] Filed: Jan. 19, 1970

[21] Appl. No.: 3,626

[52] U.S. Cl. ............................................... 444/1, 340/172.5
[51] Int. Cl. .................... G06f 9/10, G06f 13/00, G06f 15/16
[58] Field of Search ............................................... 340/172.5

[56] References Cited

UNITED STATES PATENTS

| | | | |
|---|---|---|---|
| 3,546,677 | 12/1970 | Barton et al. | 340/172.5 |
| 3,504,349 | 3/1970 | Wallis | 340/172.5 |
| 3,530,438 | 9/1970 | Mellen et al. | 340/172.5 |
| 3,528,062 | 9/1970 | Lehman et al. | 340/172.5 |
| 3,482,214 | 12/1969 | Sichel et al. | 340/172.5 |
| 3,387,274 | 6/1968 | Davis | 340/172.5 |
| 3,350,693 | 10/1967 | Foulger et al. | 340/172.5 |
| 3,569,938 | 3/1971 | Eden et al. | 340/172.5 |
| 3,412,382 | 11/1968 | Couleur et al. | 340/172.5 |
| 3,487,370 | 12/1969 | Goshorn et al. | 340/172.5 |

*Primary Examiner*—Raulfe B. Zache
*Assistant Examiner*—Ronald F. Chapuran
*Attorney*—Roger S. Borovoy and Alan H. MacPherson

[57] ABSTRACT

A system for controlling the transfer of pages between a large disc memory and a much smaller core memory in response to requests for the transfer of pages from the disc memory to the core memory, including a first plurality of control words, which define an In-Core List. Each of these control words is associated with a different core page. The word's fields are used to designate various information related to the disc page located in the core page associated with the word, as well as the availability of the core page to have a disc page transferred thereto. The system includes circuitry to form a Paging Queue comprising of other control words. Each word in the Paging Queue includes all the information necessary to define which core page should be emptied of which disc page located therein, to make room for a new disc page which is requested, and/or the number of a new disc page and the core page into which it is to be transferred. The transferring of pages between the memories is independent of the order in which page requests are received. The accessibility of the core memory is dynamically variable.

2 Claims, 24 Drawing Figures

WILLIAM R. SMITH
REX RICE
STANLEY MAZOR
INVENTORS

BY

ATTORNEYS

WILLIAM R. SMITH
REX RICE
STANLEY MAZOR
INVENTORS
BY Alan H. MacPherson
ATTORNEYS

WILLIAM R. SMITH
REX RICE
STANLEY MAZOR
INVENTORS
BY
ATTORNEYS

WILLIAM R. SMITH
REX RICE
STANLEY MAZOR
INVENTORS

BY Alan H. MacPherson

ATTORNEYS

WILLIAM R. SMITH
REX RICE
STANLEY MAZOR
INVENTORS
BY
ATTORNEYS

FIG. 9a

PAGE CONVERSION TABLE

| | | |
|---|---|---|
| CP1 | DP 325 | RW |
| CP2 | DP 111 | RW |
| CP3 | DP 113 | RW |
| CP4 | DP 400 | RW |

13

FIG. 9b

| | | |
|---|---|---|
| CP1 | DP 325 | RW |
| CP2 | – | RW |
| CP3 | DP 113 | RW |
| CP4 | DP 400 | RW |

FIG. 9c

| | | |
|---|---|---|
| CP1 | DP 325 | RW |
| CP2 | DP 326 | RW |
| CP3 | DP 113 | RW |
| CP4 | DP 400 | RW |

FIG. 10

| | | | | | | | |
|---|---|---|---|---|---|---|---|
| JN | PQL | PS | DFC | PP | CPN | PR | JP12 |

WILLIAM R. SMITH
REX RICE
STANLEY MAZOR
INVENTORS
BY Alan H. MacPherson
ATTORNEYS

INVENTORS
WILLIAM R. SMITH
REX RICE
STANLEY MAZOR
BY
ATTORNEYS

WILLIAM R. SMITH
REX RICE
STANLEY MAZOR
INVENTORS
BY
ATTORNEYS

WILLIAM R. SMITH
REX RICE
STANLEY MAZOR
INVENTORS
BY
ATTORNEYS

PATENTED MAR 7 1972 3,647,348

SHEET 10 OF 16

WILLIAM R. SMITH
REX RICE
STANLEY MAZOR
INVENTORS

BY Alan H. MacPherson

ATTORNEYS

WILLIAM R. SMITH
REX RICE
STANLEY MAZOR
INVENTORS

BY

ATTORNEYS

WILLIAM R. SMITH
REX RICE
STANLEY MAZOR
INVENTORS

BY Alan H. MacPherson

ATTORNEYS

WILLIAM R. SMITH
REX RICE
STANLEY MAZOR
INVENTORS
BY
ATTORNEYS

WILLIAM R. SMITH
REX RICE
STANLEY MAZOR
INVENTORS

BY

ATTORNEYS

INVENTORS
WILLIAM R. SMITH
REX RICE
STANLEY MAZOR
BY
ATTORNEYS

WILLIAM R. SMITH
REX RICE
STANLEY MAZOR
INVENTORS

BY [signatures]

ATTORNEYS

HARDWARE-ORIENTED PAGING CONTROL SYSTEM

BACKGROUND OF THE INVENTION

1. Field of the Invention:

The present invention generally relates to a multiprocessor system of the type including different kinds of memories and, more particularly, to a hardware-oriented control system for use in a multiprocessor system, in which memories of different sizes, with different performance functions and capabilities, are incorporated to control the transfer of data between the different memories.

2. Description of the Prior Art:

The significant increase in computer usage has led to the development of time-shared multiprocessor systems. As defined herein, such a system is assumed to comprise a plurality of different types of processors which are controllable to perform requested processing operations. Each processing operation may involve the use of the processing of one or more of the different processor types. Each requested processing operation, which may be defined as a job, may be received from any one of a plurality of users or sources, which the system is designed to service. Time sharing is accomplished by operating the system so that the various processors thereof simultaneously execute their processing tasks for different jobs which require their services.

Typically, in such a time-shared multiprocessor system, two basic types of memories are incorporated. One type is a large capacity, though relatively slow, memory while the other type is a relatively small capacity, though very fast, memory. The large capacity memory which may take the form of one or more disc files is used to store all data in the form of multibit characters or words which are received from the various users for job performance and all the processed words, before they are supplied to the requesting users. In a system of any significant size, a storage capacity of up to a billion characters may be desired. The smaller though much faster memory is used for temporary storage of those words which are needed by the various processors during program execution. The latter memory's high speed is necessary to enable the system to execute the programs as fast as possible.

As is appreciated by those familiar with the art, the two types of memories are needed since, at the present state of the art, the cost of a high-speed memory is great. This cost is directly related to the memory's size or storage capacity. Such a memory with an extremely large storage capacity, for example, several hundred million or up to a billion characters, would make the system prohibitively expensive. Thus, to reduce cost a relatively inexpensive large capacity memory is used. However, since the large capacity memory is slow, a fast memory of a limit capacity is also incorporated. As previously indicated, the slow, large-capacity memory may be one or more disc files, while the high-speed memory may be a core memory. Hereafter, for explanatory purposes only, the large, slow memory will be referred to as the disc memory (DM), while the smaller faster memory will be referred to as the core memory (CM).

The disc memory is divided into a large number of blocks, often referred to as pages, each page including an equal number of addressable locations or cells, in which words are stored. Each page is identifiable by a page address, hereafter referred to as a page number (PN). Likewise, the core memory comprises a plurality of numbered pages. The sizes of the pages in the disc and core memories are the same. However, since the core memory is the smaller of the two, it comprises fewer pages.

Before a processor can perform a task for a job, it commands the system to transfer pages, containing the words needed for the task execution, from the disc to the core memory. After the task is completed, the pages, containing the processed words, are returned to the disc memory for subsequent supply to the job-requesting user or source. Preferably, all addressing of the core memory is done in terms of the addresses in the disc memory. The core memory has associated therewith a page conversion table which may be organized as an associative memory. When an address is received in terms of a disc page number, the table is searched to determine in which core page, if any, the particular disc page number is located.

A processor may, during task execution, require a word from a page which is not in the core memory. In such a case it may command the system to transfer the disc page containing the particular word to the core memory. Until such transfer occurs, the processor may be disabled from proceeding in its execution of the particular task. Thus, the efficient transfer of pages between the two memories is of primary importance. Efficient page transfer becomes particularly significant as the number of processors and the number of jobs, which they may be requested to perform, increases. All transfers between the two memories are performed in page sizes.

The problem of page transferring becomes particularly complicated when the core memory is full with disc pages which were transferred thereto from the disc memory, and which contain words, used by various processors in task execution. Under such circumstances if a certain processor needs a disc page to be transferred to the core memory in order to enable it to continue with its task execution, since the core memory is full, a decision has to be made whether the request for a page transfer should be made whether the request for a page transfer should be fulfilled or not. If the request is to be fulfilled, i.e., a decision is made to transfer the needed disc page to the core memory, prior to actually executing such transfer, room must be created in the core memory. That is, a disc page has to be returned to the disc memory to make room for the new disc page. Thus, a decision must be made which disc page should be returned to the disc memory.

At the present state of the art, page transferring and decisions associated therewith are made by means of special purpose programs known as software. Although the control of page transferring by means of software is not completely inadequate, their use is very disadvantageous for several significant reasons. The execution efficiency of a software paging algorithm is generally poor, resulting in the use of the central processing unit (CPU) for various overhead functions which do not pertain to the execution of jobs. In addition, this reduces the system performance in two ways. First, it takes CPU time away from job processing. Secondly, it reduces the rate in which page requests can be handled. The software program that controls paging must be in the core memory at all times, thus reducing the amount of core memory available for storing needed disc pages.

Thus, a need exists for a new approach to the control of page transferring in a system of the type herebefore described. That is, a need exists for a page transferring control system which is faster and more flexible than prior art control techniques. A more flexible technique is assumed to be one which is capable of controlling the allocation of page space in the core memory to be a function of a plurality of variable parameters including job significance, page significance as well as other parameters to be discussed hereafter.

OBJECTS AND SUMMARY OF THE INVENTION

It is a primary object of the present invention to provide a new improved page transfer control system for use in a multitype memory time-shared multiprocessor system.

Another object is to provide a new page transferring control system for use in a multitype system which is faster than prior art systems which are software dependent.

A further object is to provide a highly reliable system for use in a multitype system to control page transferring between two basic different memory types with a high degree of flexibility in order to optimize the system's performance.

Still another object of the present invention is to provide an arrangement, for use in a multitype system, to control the transfer of pages between a very large, though relatively slow memory, and a much faster and smaller type memory, as a function of easily variable parameters, including the degree of priority of a processing job which may require page transfer, and page significance, as related to the degrees of significance of other pages.

These and other objects of this invention are achieved by providing a novel page transferring or paging control system which is hardware oriented rather than software oriented. The novel system incorporates easily accessible control words whose contents are used to indicate which disc pages from the disc memory need to be transferred to the core memory and for which jobs, the page content of each core page, and other information, to be described hereafter in detail. Each control word includes a plurality of fields which are used to contain different types of information for use in paging control.

The novel system includes a plurality of working registers and other circuits, all hereafter referred to as hardware, which operate on and modify the various fields of the control words, during each controlled paging operation. Basically, the control words include a first plurality of control words which includes a separate control word for each core page. One field of this word is used to store the number of a disc page when the latter is temporarily stored in the particular core page. These words are linked together to form an In-Core List (ICL). The novel system includes circuitry which is capable of interrogating the ICL to determine which core page if any does not store a disc page. If all store disc pages, the circuitry is capable of interrogating other fields of these control words to determine from which one of the core pages a disc page should be pushed out and ret$rned to the core memory in order to make room for another disc page, requested by one of the jobs.

The control words also include a second plurality of control words. When a request for the transfer of a particular disc page to the core memory for a particular job is received, the ICL is interrogated. If a decision is made to return one of the disc pages to the disc memory from one of the core pages in order to make room in the core memory for the requested disc page, one of the control words of the second plurality of words is used to hold necessary information. This information is used to control the return of the old disc page to the disc memory and the transfer therefrom of the requested disc page. All the used control words of the second plurality of words are linked together to form a Paging Queue, hereafter referred to as the PQ.

The novel system includes hardware which responds to various channel interrupts from the disc memory which indicate sectors or channels of the disc memory into which disc pages, previously stored in the core memory may be restored, or from which pages, which have to be stored into the core memory may be read out. In response to each channel interrupt the PQ is interrogated to determine which disc page, if any, can be stored back into the particular disc memory sector or channel or readout therefrom.

The novel features that are considered characteristic of this invention are set forth with particularity in the appended claims.

The invention will best be understood from the following description when read in connection with the accompanying drawings.

BRIEF DESCRIPTION OF THE DRAWINGS

FIGS. 9*a*, 9*b* and 9*c* are simple format diagrams of a core memory, addressable through a page conversion table;

FIG. 10 is a diagram of a different format of a page control word;

DESCRIPTION OF THE PREFERRED EMBODIMENT

Figure 1:
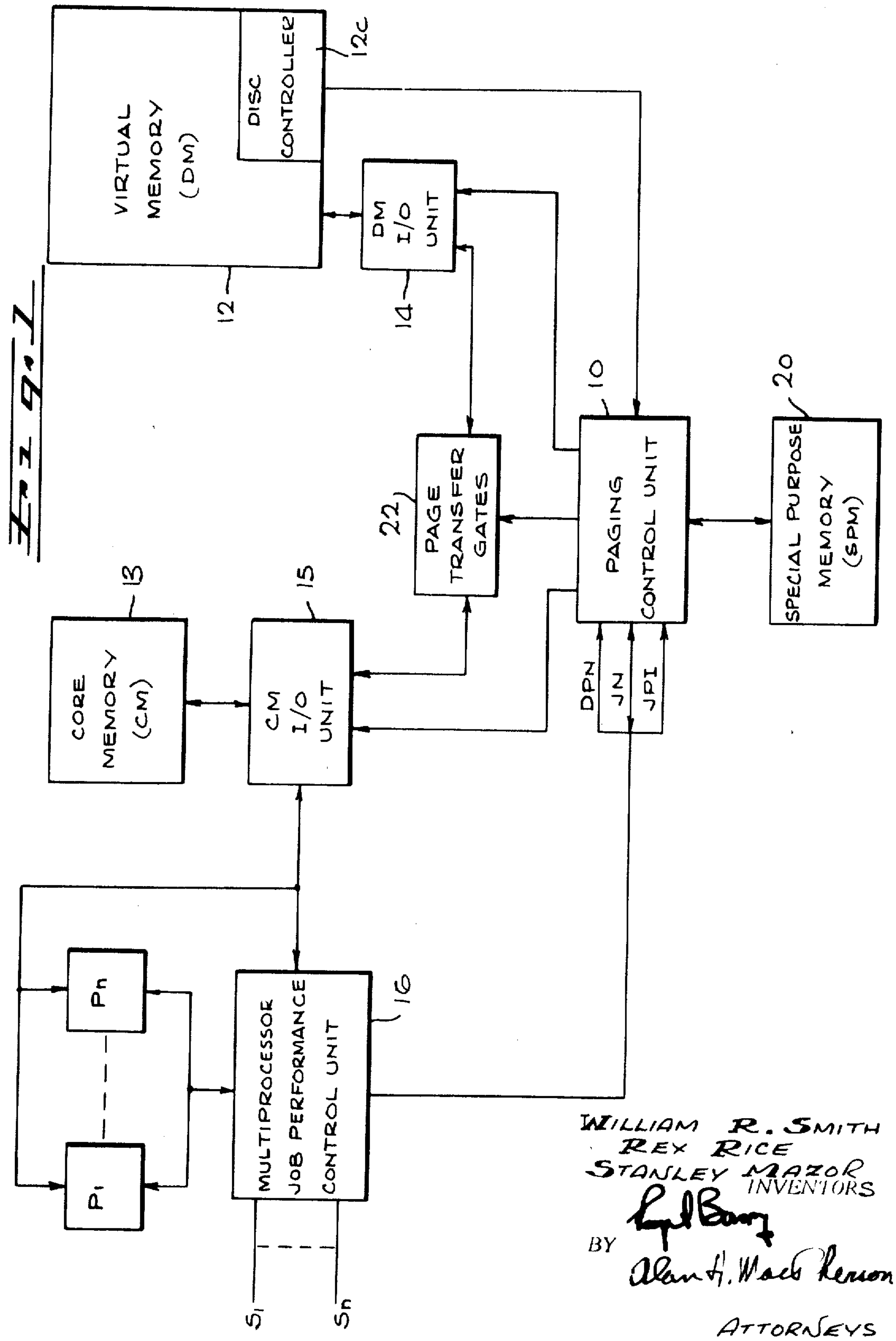
FIG. 1 is a general block diagram of the present invention.

Reference is now made to FIG. 1 which is a simple block diagram of a time-shared multiprocessor system of the type, in which the present invention is assumed to be incorporated. The hardware-oriented paging control system of the present invention is represented in FIG. 1 by a paging control unit (PCU) 10 which is used to control the transfer of pages between a virtual disc-type memory (DM) 12 and a core-type memory (CM) 13. The DM 12 represents a very large but slow memory, and the CM 13 represents a very fast but much smaller memory. Communication with the DM 12 is achieved through its input/output (I/O) unit 14, while an analogous unit, CM I/O unit 15 is used to provide communication with the CM 13. The time-shared multiprocessor system, in which the present invention finds particular application, is assumed to include a plurality of processors PI–Pn which are capable of performing their processing tasks on one or more multitask jobs, requested by any one of a plurality of sources or users SI–Sn which are in communication with the processors via a multiprocessor job performance control unit 16.

In accordance with the teachings of the present invention, it is assumed that both memories 12 and 13 are used to store multicharacter words in equal length multiword pages. Clearly however, since the DM 12 is considerably larger than the CM 13, generally, in the order of 1,000:1, the number of pages in the DM 12, each hereafter referred to as a disc page and designated by a disc page number (DPN). The number of disc pages is considerably greater than the number of pages in the CM 13, each is hereafter referred to as a core page and identified by a core page number (CPN).

In practice, it is assumed that all the words, received from the various sources for processing, as well as all the processed words or data, are stored in the pages of DM 12, until they are supplied to the job requesting sources. The CM 13, on the other hand, is used to store words which are needed by any of the processors during the performance of a task. The needed words are transferred from the DM 12 to the CM 13 in page sizes only. After processing is completed, and if any data in the page has changed, the page containing the processed words is retransferred from the CM 13 to the DM 12. The DM 12 is assumed to be nondestructive readout memory. If no change is made in the data within the page while it is in the CM, it is not necessary to reread the page back into DM.

When a particular disc page is transferred to the CM it may be located at any of the core pages, as will be described hereafter in detail. The CM I/O 15 is assumed to incorporate a page-conversion table, which identifies the disc pages in the CM, and their sample locations in the various pages thereof. Word addresses, supplied by unit 16 and the various processors to the I/O 15, are assumed to be in terms of the DM addresses, which are converted by the page-conversion table in unit 15, to corresponding CM addresses.

The novel PCU 10 of the present invention is used whenever any of the processors supplies an address to the I/O unit 15 and as a result of such addressing, it is found that the disc page, containing the particular word is not located in the CM 13. In such a case, the performance of the task of the particular processor cannot proceed until the complete disc page, containing the particular word, is transferred from the DM 12 to the CM 13. Thus, as previously pointed out it is the function of the novel invention to control the transferring of the required disc page to the CM, a problem, which is greatly complicated, if at the particular instant, all the core pages are filled with disc pages. In such a case, the disc page, containing the particular word cannot be transferred to the CM until a previously supplied disc page is removed or pushed out from one of the core pages and returned to the DM, in order to make room in the CM for the disc page, containing the particular word.

In accordance with the teachings of the present invention, when a required word is found not to be in the CM, the control unit 16 supplies the PCU 10 with the number of the disc page, i.e., the DPN, in which the required word is located. The unit 16 also supplies the control unit 10 with the number of the job for which the particular word is required. As will be pointed out hereafter, in some embodiments of the present invention, the unit 16 may also provide the control unit 10 with at least one job priority indicator (JPI) for controlling page transferring or paging to be a function of job priority. However, for the present explanation, the job priority indication may be ignored.

As shown in FIG. 1, the PCU 10 has associated therewith a Special Purpose Memory (SPM) 20, which is used to store various control words, used by the hardware of PCU 10, in controlling the paging operation. In practice, the SPM 20 may be part of the CM 13, i.e., the control words may be stored at specific designated addresses in the CM 13. However, in order to simplify the description, it will be helpful to think of the control words as being stored in the separate Special Purpose Memory, such as SPM 20. The PCU 10 is also coupled to the I/O units 14 and 15, as well as to the DM 12 and to page transfer gates 22. The latter are actuated by unit 10 to permit the transfer of multiword pages between the two memories, only when proper page transferring can take place.

Figure 2:
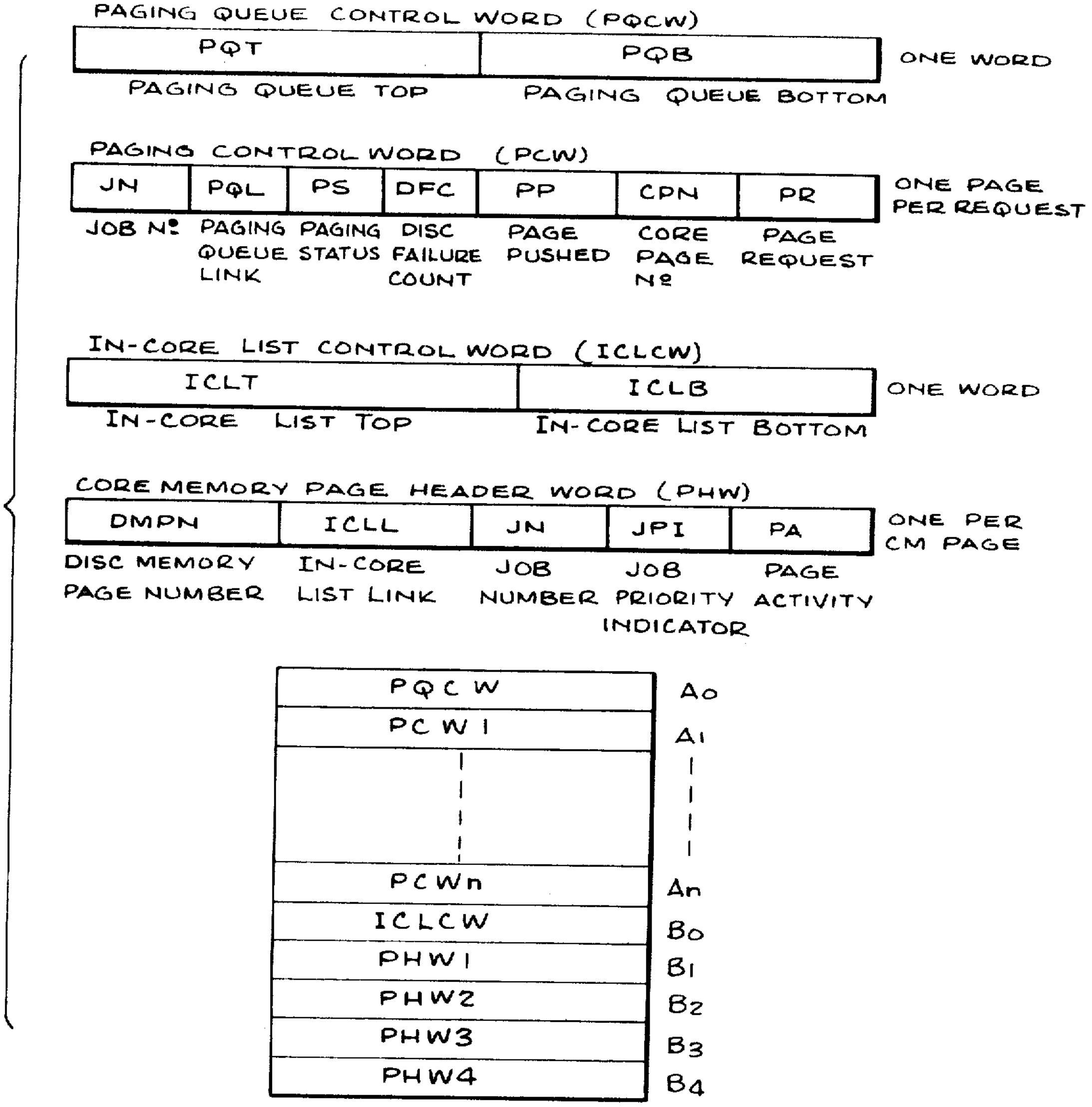
FIG. 2 is a diagram of the formats of different control words and a special purpose memory which are incorporated in the present invention.

The manner in which the paging control unit 10 performs its functions may best be explained by first describing the format of the various control words storable in SPM 20. Their formats and a simplified memory format of SPM 20 are shown in FIG. 2 to which reference is now made. Basically, the control words include a single Paging Queue Control (PQC) word, hereafter also designated by PQCW, a single In-Core List Control (ICLC) words, also designated by ICLCW, a plurality of paging control (PC) words, each also designated by PCW, and a separate Core Memory Page Header (PH) word, also designated by PHW, for each of the pages in the CM 13. The number of the PCW's depends on the maximum number of page transfer requests which may be supplied by the control unit 16 to the PCU 10 for execution. In FIG. 2, this number is assumed to be *n* with the PCW's being designated PCWl-PCWn. For explanatory purposes the CM 13 is assumed to consist of four pages, CP1-CP4 so that the control words include only four PHW's, designated PHW1-PHW4.

As seen, each of the control words includes a plurality of fields which are designed to contain numbers or addresses or status-indicating flags, as will be described hereafter in detail. Briefly, the PQC word is used to serve as a pointer to a Paging Queue (PQ) which includes one or more PCW's, depending on the particular number of page transfer requests which have to be executed at any given time. Similarly, the ICLC word is used to serve as a pointer of an In-Core Queue or List (ICL) which is formed by the various PHW's which are used among other purposes, to designate the various disc page numbers (DPN's) in the various core pages and the job numbers, requiring the particular disc pages.

Figure 3:
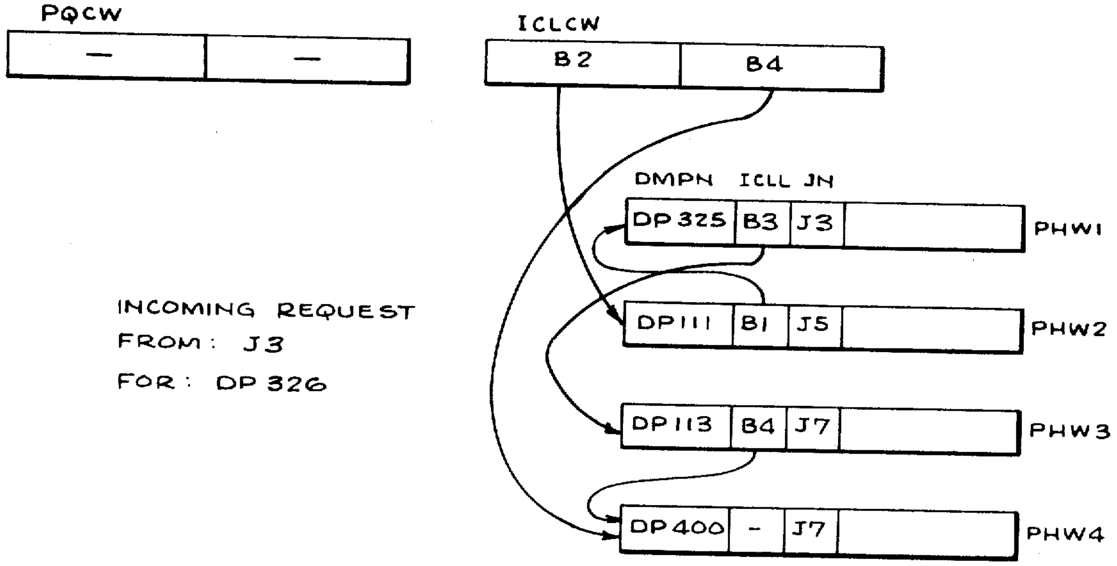
FIGS. 3, 4 and 5 are simple diagrams of an In-Core List and a Paging Queue, useful in explaining the manner in which the two are modified in response to a page request.

In practice, when a disc page is transferred to the CM, the number of that disc page, i.e., the DPN, is stored in the DMPN field of the PH word, associated with the core page in which the disc page is located. Also, the job number (JN) for which the disc page was transferred to the CM is entered into the JN field of the PH word. The ICLL fields of the various PH words are used to link the words to form the ICL. The order of the PH words in the list depends on the order in which disc pages have been transferred to their associated core pages. The ICLT and ICLB fields of the ICLC word are used to store the addresses of the PH words, associated with the core pages in which the earliest and latest transferred disc pages, respectively, are located. Reference is now made to FIG. 3 in which an example of an ICL is shown. The list indicates that core pages CP1-CP4, with which PH1-PH4 are associated, store disc pages DP325, DP111, and DP400, respectively. The contents of the JN fields of the four control words indicate that DP325, DP111, DP113 and DP400 have been transferred to the CM to enable the processing tasks for Jobs J3, J5, J6 and J7 respectively.

The PH words are linked together by the contents of their ICLL fields, so that the top PH word in the list is the one associated with a core page in which the earliest entered disc page is located. The PH word at the bottom of the list is the one associated with the core page into which the latest entered disc page was transferred. The content of each ICLL field is the address of a subsequent PH word in the list. Pointing to the list is the ICLC word whose ICLT field points to the top PH word in the list, and the ICLB field points to the bottom PH word in the list. The pointing is achieved by storing in these two fields, the addresses of the list's top and bottom PH words. Thus, as shown in FIG. 2, since DP111 is stored in PHW2, the top PH word in the list, whose address B2, is in the ICLT field of the ICLC word is the earliest in the CM, while DP400, stored in PHW4 is the last to have been transferred to the CM, since the address, B4 of PHW4 in SPM 20 is stored in the ICLB of the ICLC word.

From the foregoing it is thus seen that the ICLC and the various PH words serve to form a list in which the various PH words are linked together in an order depending on the relative entry times of the various disc pages in their associated core pages. Also, each PH word has a field (DMPN) which is used to contain the number of the disc page in its associated core page, as well as the number of the job for which the disc page has been transferred to the CM.

Let it be assumed that when the In-Core List is as shown in FIG. 3, there are no requests for page transfers. Consequently, the two fields, PQT and PQB of the PQC word are empty, as indicated by the two dashes in the format of PQCW. Let it further be assumed that thereafter a page transfer, or paging request, is received from the control unit 16, indicating that disc page, DP326 is required for the execution of processing for J3. A request is received by supplying PCU 10 with a DPN and a JN.

In one embodiment of the invention, when the request is received the PCU interrogates the In-Core List to determine whether any of the core pages is not occupied by a disc page. Assuming that all the core pages are occupied, as is the case in the example, diagrammed in FIG. 3, the PCU 10 determines which of the core pages is to the longest to be occupied by a disc page. Alternately stated, the PCU determines the disc page which is the longest in the CM. In the particular list arrangement, shown in FIG. 3, it is DP111 in CP2, associated with PHW2, the top PH word in the In-Core List, whose address B2 is in the ICLT field of the ICLC word.

Figure 4:
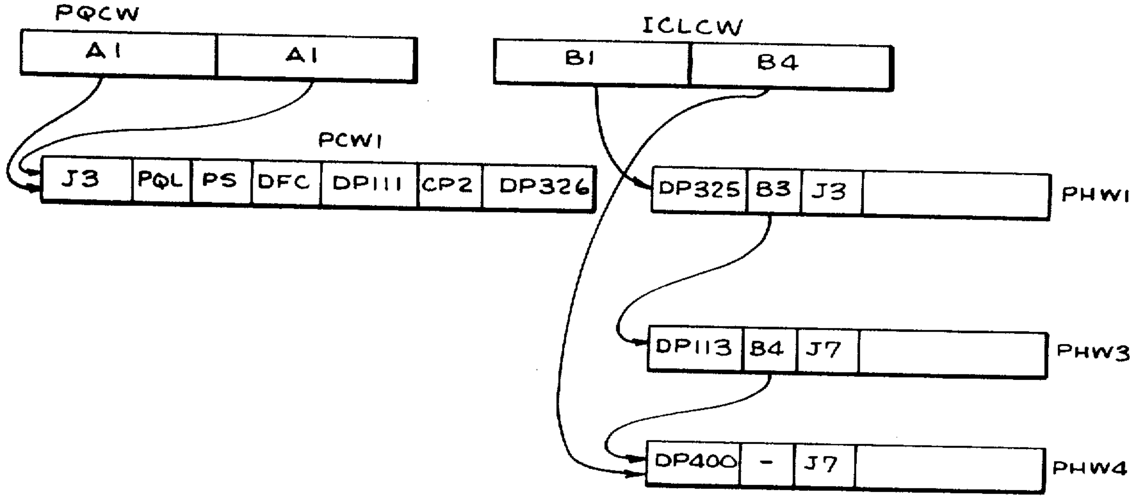

Once a determination is made which disc page has been in the longest in the CM, the PH word, associated with the core page in which such disc page is located, is removed from the In-Core List. In the particular list arrangement, in which the top PH word is always associated with the core page containing the earliest transferred disc page, it is the top PH word which is removed from the list. The removal is accomplished by replacing the content of the ICLT field of the ICLC word with the content of the ICLL field of the removed PH word. In the particular example, B1 in ICLL of PHW1 is stored in ICLT of ICLCW, as shown in FIG. 4. Thus, PHW1 now becomes the top PH word in the list.

In addition to removing the top PH word from the ICL, one of the unused PC words in SPM20, such as PCW1, is used to store information vital for paging control. Basically, in the particular example, the CPN field of PCW1 is used to store the core page number, (CP2) from which the disc page number (DP111) has to be pushed out. The number DP111 is stored in the PP field. The PR field of the PC word is used to store the requested disc page number, DP326. Also, the JN field of the PC word is used to store the job number J3 for which the requested page is transferred. These entries are shown in FIG. 4 in the format of word PCW1.

As shown, the PQT and PQB fields of the PQC word store the address, A1 of PQCW1, since PQCW1 is the only word in the Paging Queue and therefore, it represents the top as well as the bottom word in the PQ. If before the paging of DP326 is completed, another paging request is received a second PC word is used to store the necessary paging information for the second request, and the second PC word is linked to PCW1 by storing in the PQL field of the PCW1 the address in SPM 20 of the second PC word in a manner analogous to the In-Core List formation, herebefore explained. In such a case, PQB will store the address of this second PC word.

It should be apparent, that before disc page DP326 can be transferred from the DM to CP2 of the CM, the previous disc page, i.e., DP111, has to be pushed out therefrom. In the present invention, the PS field of the PC word represents a paging status field. When the aforementioned information is transferred into a PC word, the PS field is set to indicate that the disc page in the PP field has to be pushed out from the core page, indicated in the CPN field. Only thereafter can the disc page, whose number is in the PR field, be transferred to the core page.

In accordance with the teachings of the present invention, the PS field is initially set to indicate that page pushing must first take place before page transferring can occur. As used herein, page pushing refers to the transferring of a disc page from the CM back to the DM, while page transferring is used to indicate the transferring of a disc page from the DM to the CM. It is appreciated that in each one of these steps a disc page is actually transferred from one memory to the other. However, in order to distinguish the direction of page transferring, the different terms "page pushing" and "page transferring," are utilized.

As seen from FIG. 1, to which reference is again made, the PCU 10 is directly coupled to a disc controller 12C of the DM 12. This connection is used to indicate that the PCU 10 is capable of responding directly to interrupt-type signals from the controller of the DM. These signals, hereafter referred to as "interrupts" are of the type well known by those familiar with the art of disc file type memories. Basically, each interrupt indicates a segment or sector of the disc file which is approaching Read/Write heads, thereby indicating which disc pages can be read out from the DM or written thereinto. In accordance with the teachings of the present invention, each interrupt is utilized by the PCU 10 to interrogate the entire Paging Queue or PQ, formed by the PC words, headed by the PQCW. The purpose of the interrogation is to determine whether there are any disc pages which can be pushed into the sector, indicated by the interrupt, or be transferred therefrom to the CM.

In the particular example, assuming that the Paging Queue consists of the single word PCW1 (see FIG. 4), when the interrupt, related to the sector in the DM in which DP111 is located, is sensed for the first time, the PCU 10 (see FIG. 10) enables the page transfer gates 22, as well as the I/O units 14 and 15 to enable the pushing out of DP111 from CP10 in the CM into the DM. When the pushing is completed, the PS field of PCW1 is modified to indicate that the pushing operation has been completed. Then, when the interrupt indicating the availability of the segment associated with DP326, is received, the transfer gates 22, as well as the two I/O units 14 and 15 are again enabled. However, in this cycle of the operation, the DM is operated in a Read mode while the CM is operated in a Write mode, so that DP326 is read out from the DM and is transferred through the gates 22 into the CM at CP2. It should be pointed out, that if prior to pushing DP111 from the CM into the DM, the interrupt associated with the segment of DP326 is sensed, even though this interrupt has to be later used for transferring DP326 to the CM, it cannot be done at this point, before DP111 is pushed out from CP2, to make room for DP326, therein.

Figure 5:
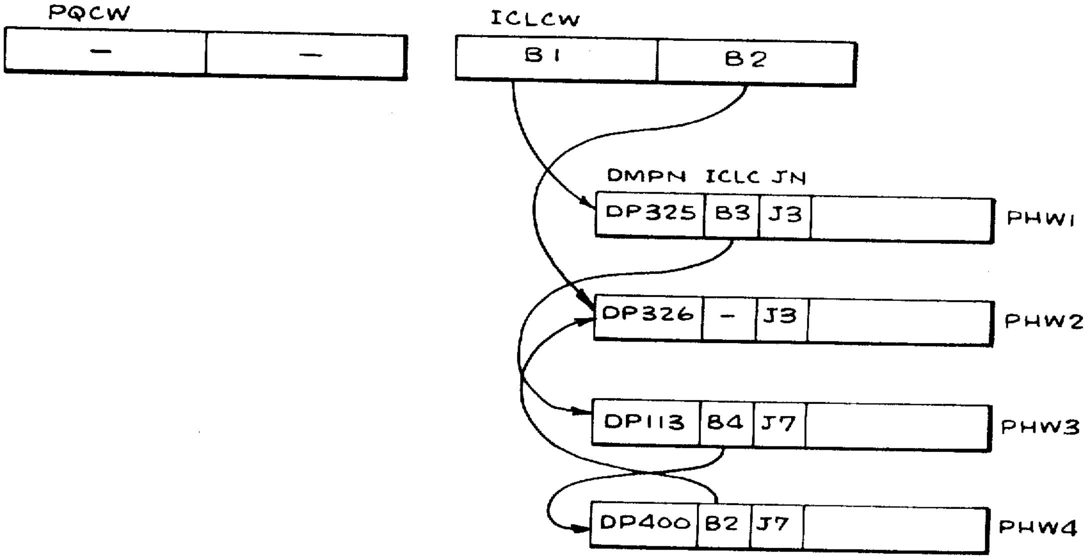

After DP326 is read out from DM 12 and stored in CM 13 at CP2, the PH word PHW2 associated with CP2, is added to the bottom of the In-Core List, since it is associated with a core page CP2 into which the latest disc page has been transferred. The In-Core List, with PHW4 at the bottom thereof, is shown in FIG. 5 to which reference is made. As seen, PHW2 is added to the bottom of the ICL by having its address B2, entered in the ICLL field of PHW4, the previous last word in the list, and by entering the address B2 of PHW2 in the ICLB field of the ICLC word. Also, the DMPN field of PHW2 is made to store the disc page number DP326 to indicate the disc page which was transferred to CP2. The JN field of PHW2 is made to store the job number J3 for which the disc page, DP326 has been transferred into the CM.

Once the PH word is added to the bottom of the list, the paging operation is completed by supplying the job number J3 for which the paging has been performed, to control unit 16 from PCU 10. This may be done by transferring the content of the JN field of the PCW1 to the control unit 16. Thereafter, PCW1 is deleted from the Paging Queue. Since hereinbefore it has been assumed that PCW1 was the only word in the Paging Queue, the two fields of PQCW are reset to an all-zero state, as indicated in FIG. 5 by the two dashes in the word format.

From the foregoing description, it should thus be apparent, that the In-Core List, formed by interlinking the various PH words, serves to indicate the various disc pages which are located in the cm and the various jobs for which they are placed therein. Furthermore, since each PH word is associated with a different core page, the entry in the word's DMPN field indicates the disc page in the particular core page, and the entry in the JN field of the PH word indicates the job number for which the disc page is in the core memory.

Once a decision is made to push a disc page from a certain core page, the PH word, associated with the particular core page, is deleted from the In-Core List. Then, when a new disc page is transferred into the core page, its associated PH word is added to the bottom of the In-Core List. Again, it should be pointed out that in the foregoing description it is assumed that the disc page to be pushed out is the one which is longest in the CM, indicated by the presence of the PH word, associated with the core page in which the disc page is located, at the top of the list. Thus, hereinbefore, it has been assumed that a disc page is pushed out from the core page, associated with the top PH word in the In-Core List. Consequently, the order of the PH words in the ICL, from top to bottom, provides an indication of the relative times of the presence of the various disc pages in the various core pages.

While the PH words are used to form the In-Core List, each PC word is used to store the information necessary for paging control, for each paging request. As apparent from the foregoing description, fields of a PC word are used to indicate the disc page to be pushed out from an indicated core page, as well as the disc page to be transferred into the same core page. Also, it is used to indicate the job number for which the paging is requested, as well as the paging status.

Although in the foregoing description it has been assumed that CM 13 comprises only four core pages, it is apparent that in practice, the CM comprises a much larger number of core pages, though smaller than the number of pages in the DM. It should further be apparent, that in a relatively large time-shared multiprocessor system, in which the present invention is assumed to be incorporated, since various processors simultaneously perform their tasks on various jobs, paging requests may be successively received from the control unit 16. In such a case the Paging Queue (PQ) would comprise more than a single PC word, as hereinbefore shown.

Figure 6:
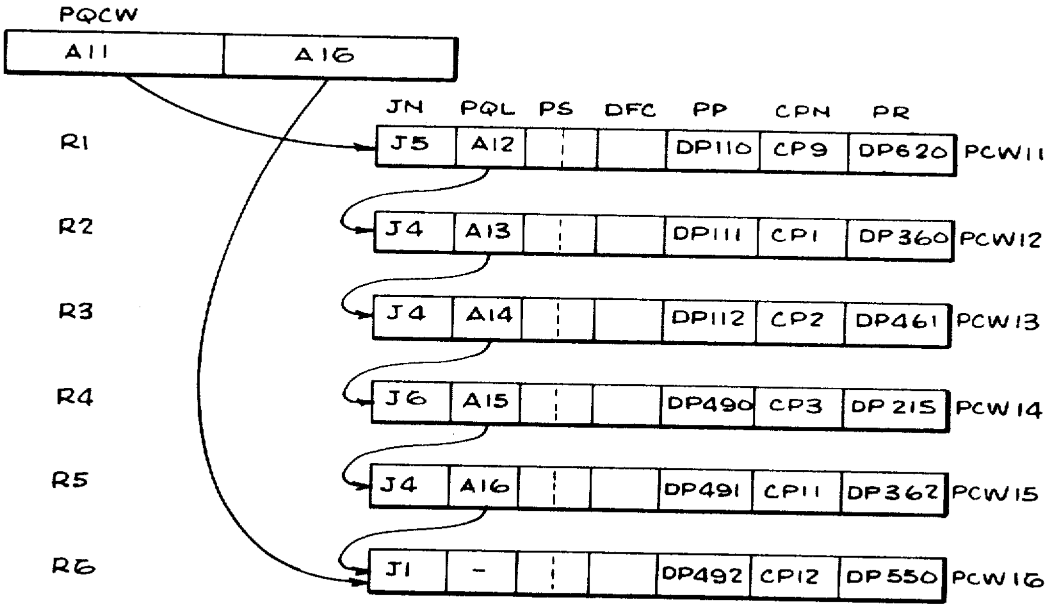
FIG. 6 is a diagram of a multiword Paging Queue.

The significant advantages realizable by the formation of a Paging Queue by means of interlinked PC words for paging control may further be highlighted by referring to FIG. 6 to which reference is now made. Therein, for simplicity, a Paging Queue comprising six PC words, designated PCW111–PCW16 is shown. The addresses of these words in SPM20 are assumed to be A11–A16, respectively. As interlinked, the six PC words are assumed to contain the paging control information, required for the performance of six successively received requests, designated in FIG. 6 by R1–R6.

From the foregoing description it should thus be apparent that request R1 is for the paging of DP620 for J5. As shown, it is assumed that after R1 has been received, it has been determined that DP110 has to be pushed out from CP9 to make room for DP620 to be transferred thereinto. The paging information, required for the performance of the other requests, R2–R6 should be obvious from the foregoing description. Let it further be assumed, that for each of the six requests, page pushing has not as yet been performed. That is, the paging status (PS) field of each word is assumed to indicate that pushing has not occurred as yet.

In accordance with the teachings of the present invention, it is assumed that when each interrupt is received from the disc controller 12C the entire paging Queue is interrogated to determine whether any of the disc page locations, associated with the particular interrupt, can be used for either page pushing or page transferring. For explanatory purposes, let it be assumed that each interrupt indicates the accessibility of a different hundred series of disc pages. That is, when the 100-series interrupt is received, any of the pages in the 100 series may be either read out from the disc memory or written thereinto.

From the foregoing it should thus be appreciated that when the first 100-series interrupt is received from 12C, and the Paging Queue is interrogated, when PCW11 is interrogated it is found that DP110 can be pushed into the DM from CP9 in the CM. When this operation is performed, the PS field of PCW11 is modified to indicate that the pushing phase or operation is completed. However, request R1 is not completed until a 600-series interrupt is received and DP620 is transferred to CP9.

When the first 200-series interrupt is received, the only request which may be affected thereby is request R4, since this request involves the page transferring of DP215, which is the only page involved in the various requests which is in the 200series. However, since at this point CP3, into which DP215 is to be transferred, is still occupied with disc page DP490 which has not as yet been pushed out therefrom, the transferring of DP215 to CP3 of the CM cannot be executed. Thus, even though the entire Paging Q is interrogated, the status or content of none of the PC words thereof is altered.

When the first 300-series interrupt is received, and the various PC words are interrogated, when PCW12 is interrogated the requirement of transferring DP360 from the DM to the CM is established. However, the transfer can only take place after DP111 has been pushed out of CP1 which occurs in response to the second 100-series interrupt. Thus, the transferring of DP360 to CP1 occurs in response to the second 300-series interrupt which occurs after the second 100-series interrupt, to complete the request R2.

As previously indicated, the request completion is accomplished by adding the PH word, associated with CP1 to the bottom of the list, and by supplying the control unit 16, associated with the time-shared multiprocessor system, with the job number for which the request R2 was made.

From the foregoing it is seen that the first, second and third 100-series interrupts will result in the pushing of DP110, DP111 and DP112 to the DM. The second 200-series interrupt will result in the transferring of DP215 to CP3 for R4, while in response to the second and third 300-series interrupts DP360 and DP362 will be transferred to the CM. The first and second 400-series interrupts will result in pushing of DP490 and DP491 from the CM, while DP461 will be transferred to CP2 for R3 during the third 400-series interrupt and in response to the fourth 400-series interrupt DP492 will be pushed out of CP12. The fourth 500-series interrupt will enable DP550 to be transferred to CP12 for R6, while R1 will be completed when in response to the first 600-series interrupt DP620 will be transferred to CP9. Thus, the order of request completion is R1, R4, R2, R5, R3 and R6, which is completely independent of the order in which the requests are assumed to have been received.

In the foregoing it has been assumed that in response to an interrupt only a single page can be either pushed out of the CM or transferred thereto. The invention, however, is not intended to be limited thereto. High-speed circuitry may be employed to push and/or transfer several pages in response to a single interrupt.

From the foregoing, it should thus be apparent, that the execution of any of the paging requests is not dependent on the order in which these requests are received by the paging control unit 10. Furthermore, it should be apparent, that by utilizing the PC control words for the various requests, and by linking them together to form a Paging Queue, which is interrogatable in response to each of the disc controller's interrupts, at least parts of different paging operations for different requests may be performed in response to the various interrupts to expedite the execution of the paging operations.

Depending on the pages to be pushed and those to be transferred, some interrupts may not effect the content of any of the PC words, while others may effect one or more fields of the PC words. Thus, such an arrangement optimizes the paging transfer time by minimizing the time required for the performance of paging for a series of requests. Such a capability is possible, since the disc memory is relatively slow while the PCU 10 is hardware oriented and SPM 20, with which it is associated is a fast-type memory so that a relatively long Paging Queue can be interrogated to determine the status of the various fields thereof and control the pushing and/or page transferring into and from the DM, in response to each one of the interrupts.

As seen from FIG. 2 and FIG. 6, each of the PC words includes a DFC field. This field serves as a counter to count disc failures, whenever page pushing or page transferring, into or from the DM, is attempted and for some reason the actual page pushing or page transferring is not performed. When such a situation arises, the counter is incremented for each attempt and a second pushing or transferring operation attempt is performed. Only if the count in any DFC reaches a predetermined maximum count or value, thereby indicating that a predetermined number of attempts have been performed without success, the maximum count in the counter may be used in the PCU 10 to interrupt its operation and alert an operator to a possible system failure.

Herebefore, the functions of the fields DMPN, ICLL and JN of each PH word have been described in conjunction with the formation of the In-Core List. As seen in FIG. 2, each PH word is assumed to include two additional fields which are designated as a page activity (PA) field and a job priority indicator (JPI) field. The functions of these two fields and the manner in which they are used will now be described. Basically, the PA field is used to indicate whether a meaningful disc page is contained in the core page, associated with the particular PH word. A core page is assumed to be active when it contains a meaningful disc page whose content must be transferred to the DM before a new disc page can be stored in the core page. On the other hand, a core page is assumed to be inactive when either it does not contain any data or whenever the disc page, contained therein, need not be pushed back to the DM, as hereinbefore described.

In accordance with the teachings of the present invention, whenever a request is made for the transferring of the page from the DM to the CM, the PA fields of the various PH words in the In-Core List are interrogated. The purpose of this interrogation is to find the PH word, closest to the top of the In-Core List, whose PA field indicates that the core page is inactive. Such a condition indicates the availability of the core page to store a disc page. Alternately stated, the condition indicates free space in the core memory.

In such a situation, it is not necessary to push out any of the disc pages from any of the other core pages. Only if the PA fields of all the PH words in the In-core list indicate that their respective core pages are active, i.e., containing meaningful disc pages, is it necessary to push out a disc page from one of the core pages to make room for a new disc page to be transferred to the CM. It should be further pointed out that since the PA field of any PH word indicates an inactive core page, a disc page may be transferred to the associated core page without preceding the page transferring by a page-pushing operation.

When the PC word for the particular page transfer request is linked to the paging queue, no information is placed in the PP field of the PC word. Also, the paging status (PS) field of the particular PC word is initially set to indicate that only page transferring is required for the particular request. That is, it is set to a state identical with that to which the field is set after a page-pushing operation is performed, as hereinbefore explained.

Herebefore, it has been assumed, that when the core pages are all active, i.e., each one of them contains a meaningful disc page, the disc page which is longest in the CM is pushed out. This is accomplished by deleting the PH word at the top of the In-core list from the list. It is apparent, therefore, that in such an embodiment, page pushing is independent of any degree of priority of the job for which the particular page has been initially transferred from the DM to the CM.

In accordance with the teachings of the present invention, in an embodiment in which each PH word includes the job priority indicator (JPI) field, when each paging request is received from the control unit 16, in addition to supplying the PCU 10 with the job number (JN) and the requested disc page number (DPN) unit 16 also provides an indication of the relative degree of priority of the job with respect to other jobs, by supplying the job priority indication, designated in FIG. 1 by JPI. In such an embodiment, when a disc page is finally transferred to a core page and the PH word, associated with the particular core page is added to the bottom of the In-Core list, in addition to entering the job number of the requesting job into the JN field of the PH word, a priority indication, JPI, is entered into the JPI field of the PH word using information from the control unit 16.

In practice, the contents of the JPI fields of all the PH words in the In-Core List are utilized in determining which disc page if any is to be pushed out from the CM whenever it is necessary to make room for another disc page. Basically, the contents of these fields are used to control page pushing to be a function of the degree of priority of the requesting job and the degrees of priorities of the various jobs for which disc pages are already in the CM. Various comparison criteria may be employed in comparing the contents of the JPI fields. For example, assuming that all the core pages of the CM are active, the JPI fields may be used so that the disc page, which is the longest in the CM and one which has been transferred thereto for a job number, with a lower priority than the priority of requesting job, is pushed out in order to make room for the transferring of a disc page into the CM for the requesting job of the higher priority. Thus, in such an arrangement, the pushing out of any disc page from the CM is a function of the length of time that the disc page is in the CM as well as the relative degree of priority of the job for which the particular page has been transferred to the CM, as compared with the priority indication of the requesting job.

Figures 7, 8:
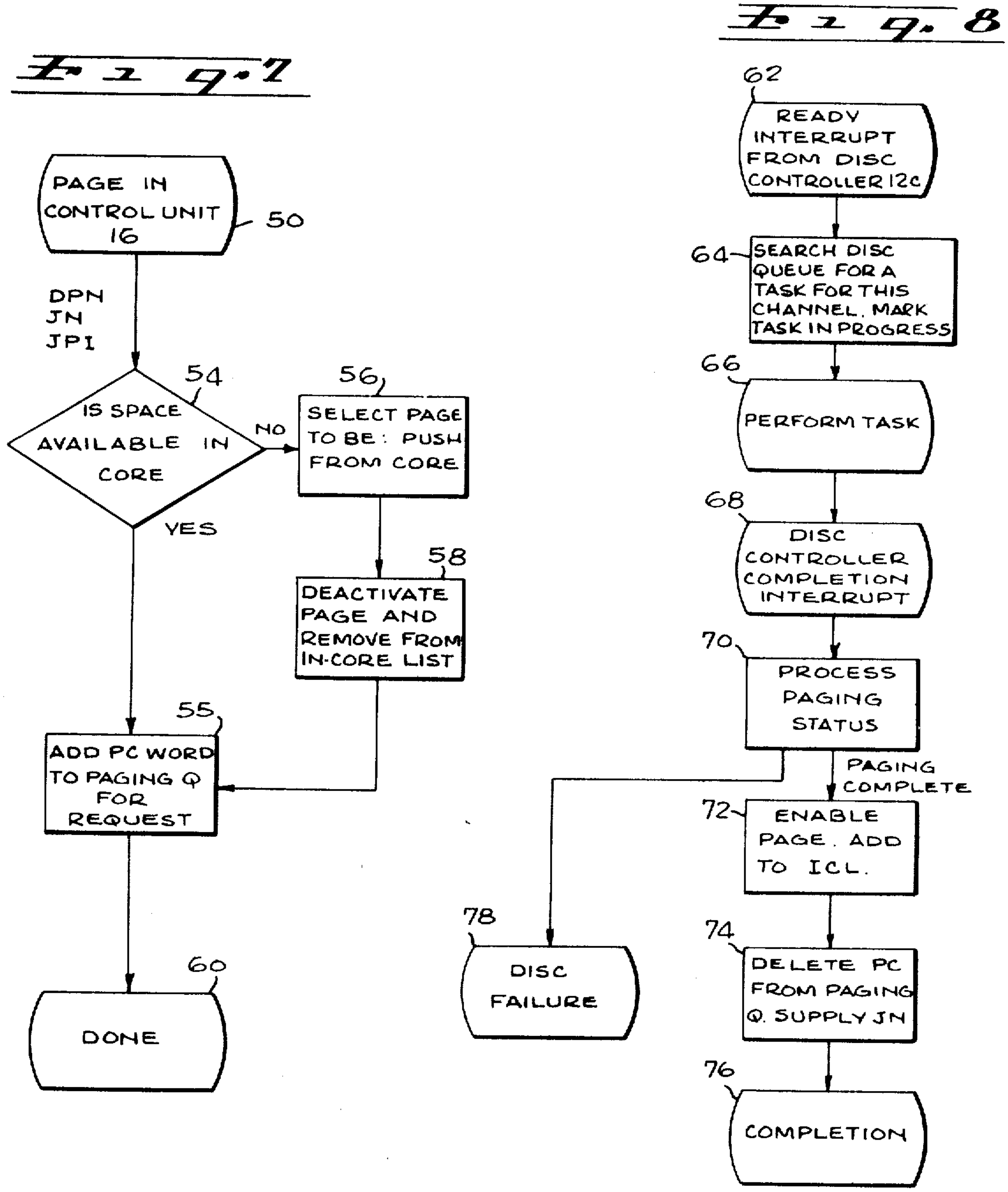
FIGS. 7 and 8 are simplified flow charts which are useful in summarizing the basic principles of operation of the present invention.

The foregoing described teachings of the present invention may be summarized in connection with FIGS. 7 and 8 which are simple flow charts of the type well known by those familiar with the art of programming and the operation of computers, to which the present invention is directed. Basically, when a paging request is received from control unit 16, the request being represented in FIG. 7 by block 50, the requested disc number, DPN, the job number, JN, for which the page is required and the job priority indication, JPI, are assumed to be supplied by unit 16 to PCU 10. Once the request is received the PCU interrogates the In-Core List to determine whether space is available in the CM. The interrogation and the determination are represented by block 54.

From the foregoing it should be apparent that space is assumed to be available if the PA field of any of the PH words is inactive. If space is available, i.e., the interrogation is answerable by "YES," the PCU proceeds to add a new PC word to the paging queue (PQ) $Q_n$ for the new paging request, an operation represented by block 55. This operation completes the addition of the paging request to the PQ, which in a sense controls the page pushing and/or transferring operations as hereinbefore described.

If, however, as a result of the interrogation (block 54) it is determined that space is not available in the core, i.e., the interrogation result is answerable by "NO," the PCU proceeds to interrogate the In-Core List and select a disc page to be pushed from a core page into which it has been previously stored. The selection of a disc page for pushing is represented by block 56. Thereafter, the PH word, associated with the core page from which a disc page is to be pushed is removed from the In-Core List, an operation represented by block 58. Block 58 may also be used to designate the deactivation of a disc page located in the CM, once it has been decided to push the particular disc page from the CM.

As hereinbefore indicated, all addressing of the CM is done by supplying the I/O unit 15 of the CM into the related CM addresses. In accordance with the teachings of the present invention, when a determination is made to push a certain disc page out of the CM, the particular disc page entry in the page conversion table is deleted, thereby preventing the content of the particular disc page in the CM from being accessible to the control unit 16 or to any of the processors, which may be operating on its content.

After performing the removal of a PH word from the In-core list and the deactivation of the disc page in the page conversion table, the PCU proceeds to perform the PC word addition to the paging queue, represented in FIG. 7 by block 55. In FIG. 7, a block 60 represents the completion of the addition of a PC word, containing the paging transferring information necessary for the execution of the paging request.

In FIG. 8, block 62 represents a ready interrupt from the disc controller 12C, associated with the DM, which is supplied to the PCU 10 indicating that a disc channel or segment, associated with the particular interrupt, is ready to accept a task. A task is assumed to be either the writing into the particular disc channel a disc page which is read out from the CM, or the reading out of a disc page as part of a page transferring operation in which a disc page is written into a core page in the CM.

When the ready interrupt is received, the PCU searches the entire paging queue, comprising the PC words for a task for the particular channel. If in searching the paging queue, which is represented by block 64, a task for the particular channel is found, it is marked as being in progress and thereafter the task if performed, as represented by block 66. At the completion of the task the disc controller 14C supplies a completion interrupt, represented by block 68, which is used to process the paging status (PS) of the particular PC word for which a task has just been performed. The processing of the PS field of the word is represented by block 70.

The processing of the PS field may result in any one of three outputs. If the PS field processing indicates that the last task was one of transferring a disc page to a core page, the paging operation is in a sense complete. Therefore, after the PS field processing, the PCU proceeds to add the PH word, associated with the core page to which the disc page was just transferred, to the In-Core List. Also information in the PC word is stored in the PH word. In addition, the page conversion table in the I/O unit 15 is updated by adding an entry therein relating the disc page, just transferred to the CM, to the particular core page in which it was entered. Thereafter, the PC word, associated with the performed paging request is deleted from the paging queue, and the job number (JN) for which the paging request was performed is sent to the control unit 16. The addition of the PH word to the In-Core List is represented by block 72, and the deletion of the word PC from the paging queue and the supply of the JN to the control unit 16 are represented by block 74. After the JN for which a paging transfer was performed is transmitted to the control unit 16 the paging request is completed, as represented by the legend COMPLETE in block 76.

If, however, the performed task, represented by block 66, was one of pushing out a disc page from a core memory to the DM, clearly, the paging request is not completed until the requested disc page is transferred into the same core page. In such a case the PS field is updated and the PC word remains in the PQ until page transferring can be performed. On the other hand if, as a result of the processing of the PS field or that particular PC word the maximum count is reached in the DFC field, a disc failure output, represented by block 78, is provided. Such an output may be used to alert an operator to the possibility of system failure.

From the foregoing description it should be apparent that in accordance with the teachings of the present invention, the processing of all paging requests from the time-shared multiprocessor system does not involve the retrieval of special purpose programs for the requests' executions. Rather, special-purpose control words are utilized, whose contents are controlled by the hardware of the PCU 10 in such a manner that they provide all the information which is necessary for automatic paging control and paging execution. The control words include a first plurality of words which are used to form an In-Core List, with the contents of the various words in the list actually defining the availability of space in the CM, as well as the various disc pages therein. Furthermore, the In-Core List, as a function of the order of the various control words in it, defines the relative lengths of times of the various disc pages in the CM so that if a certain disc page has to be pushed out or purged from the CM the particular order can be used to determine which one should be purged to make room for a new requested disc page.

Another group of control words is used to contain all the information necessary for the execution of paging for the various requests which are received. The latter-mentioned control words are interlinked to form a paging queue which is interrogatable, in response to each ready interrupt from the disc controller of the DM, so that various steps of paging operations for the various requests may be executed as expeditiously as possible rather than as a function of the order in which the paging requests are received. All of these capabilities, are incorporated in the basic embodiment of the present invention.

In other embodiments, hereinbefore described, the control words may incorporate fields, such as the page activity (PA) field assumed to be incorporated in each PH word, to enable the determination of the state of activity of each core page so as to eliminate unnecessary page pushing when some of the core pages or at least one of them is inactive. Furthermore, by including in each PH word a job priority indicator (JPI) field, the actual paging strategy, may be made a function of job priority. That is, the determination to push out a disc page from the core page in the CM, in order to make room for a requested disc page, may be made to be a function of the relative priorities of the job requesting the new disc page, and the job for which the page, which may be subject to being pushed out from the CM, has been previously transferred and placed in the CM. Also, by incorporating in each PC word a disc failure count (DFC) field, automatic retrying of page transferring, either from the CM to the DM or from the DM to the CM may be executed. Then, only if after several retries a maximum count is accumulated in the DFC field, system failure may be automatically indicated.

Herebefore, the function of each of the fields of each PH word, except for the JN field, has been described. In some embodiments, the content of this field may be used to supply the control unit 16, of the time-shared multiprocessor system, with the number of the job for which a disc page, whose number is in the DMPN, has been previously transferred to the CM. When a decision is made to push a disc page from a core page in the CM to make room for a new disc page, an operation which is partially performed by deleting the PH word, associated with the core page from which the disc page is to be pushed out, the content of the JN field of the PH word may be supplied to the multiprocessor's system to indicate that one of the pages, previously transferred for the particular job number has been selected to be pushed back into the DM.

As previously pointed out, once a decision is made to push a certain disc page from the CM, the page conversion table, associated with the CM, is modified to prevent the various processors from accessing the particular disc page in the CM. Although various techniques may be employed in implementing the page conversion table, one simple example is diagrammed in FIGS. 9a, 9b and 9c, which will now be explained. For the particular simplified arrangement in which the CM 13 is assumed to comprise only four core pages CP1–CP4, as previously assumed in conjunction with FIG. 3, the page conversion table may comprise four separate words or storage cells. Each word is associated with a different one of the core pages. Each of the words may include a field, which is used to store the number of the disc page, located in the core page with which the word is associated. For the particular example shown in FIG. 3 in which the core pages CP1–CP4 are assumed to contain disc pages 325, 111, 113 and 400 respectively, the four words may store these numbers in their appropriate fields (see FIG. 9a).

These words are assumed to be organized so that they could be simultaneously searched or interrogated as is the case in an associated-type memory. When a decision is made to push a certain disc page out of a certain core page, such as page DP111 from CP2, as was described herebefore in conjunction with FIG. 4, the four words are associatively searched and the field of the particular word containing the DP111 is reset as shown in FIG. 9b by the dash. As a result, even though at this point DP111 is still stored in CP2, it is no longer accessible to any of the processors, since the number DP111 is no longer present in the word which is part of the page conversion table.

After a disc page is transferred to a core page, the page conversion table is updated by inserting the number of the transfer disc page into the field of the particular word associated with the core page into which the disc page has been transferred. In the example, in connection with FIG. 5, the number DP326 is inserted in the word, associated with CP2 as shown in FIG. 9c, since in the example in connection with FIG. 5, it has been assumed that DP326 has been transferred into CP2 of CM13.

It is appreciated, that in any operation, situations may arise in which a disc page is transferred to a core page for readout purposes only. Since in reality, a disc memory is of the nondestructive readout type, it is appreciated that in such a case the exact disc page content is present in two places. It is available in the disc memory, as well as in one of the core pages. Thus, if while being in the core page it is not modified, which is the case if the disc page is used to readout purposes only, the page pushing operation may be dispensed with. For example assuming that DP111 was transferred to CP2 for a readout purpose only, it is appreciated that when a decision is made to push DP111 out of CP2, in order to make room for DP326 therein, since the exact content of DP111 is still available in the DM, it is not necessary to push DP111 into the DM and rewrite it therein. Its exact content is already in the DM.

Only when a disc page is transferred to the CM and some of its content is modified, i.e., some of it is rewritten, it is necessary to actually execute a page pushing operation, in order to transfer the modified content of the disc page to the DM. Thus, in accordance with the teachings of the present invention, each of the special-purpose words which together form a page conversion table may include an additional field, which is designated in FIGS. 9a–9c as the read/write (RW) field. This field which may comprise a single bit may be left in a first state, such as a binary 0 state, whenever a read-only operation is performed. The bit may be driven to a binary 1 state whenever any write operation is performed on the content in the core page with which it is associated.

When a decision is made to push out a certain disc page from a core page, such as DP111 from CP2, the RW field may be interrogated. Only if it is found to be in a binary 1 state, is actual page pushing necessary. If page pushing is necessary, the PC word which is added to the paging Q is made to include the disc page to be pushed out in the PP field, and the PS field is set to indicate that a page pushing operation is required, as is shown in FIG. 4. If, however, the RW field is in a binary 0 state, which in the particular example would indicate that DP111 was only used for readout purposes, the pushing phase may be dispensed with by setting the PS field of the PC word as if pushing has already taken place. Thus, the paging operation will be limited only to transferring a new page into the CP2 of CM13. It should be appreciated that by adding such an RW bit to each word, forming the page conversion table, the need for performing page-pushing operations of disc pages which have been transferred to the CM, for readout purposes only, is eliminated, thereby greatly expediting the paging operation.

Herebefore, it has been assumed that a single job priority indicator (JPI) is supplied to the paging control unit 10, and that such a JPI is used in determining which if any of the disc pages should be pushed out from the CM in order to make room for the requested page. It has further been assumed, that once a disc page is pushed out and the requested page is transferred to the CM, when the PH word is added to the In-Core List, the same JPI is inserted in the JPI field of the PH word.

Although such an arrangement represents a significant advance over the state of the art, the advantages realizable by supplying the JPI may further be enhanced by supplying the paging control unit 10 with two JPI's, one for page acquisition purposes and the other for page-holding purposes. For example, a first JPI may be supplied to indicate the relative degree of significance or importance of the job, requesting the page. If the job which requests the page is of very high priority or significance, a high JPI is supplied to enable that particular job to acquire or have a disc page transferred therefor to the CM. The second JPI may designate the priority or expected time, required for the particular requested disc page to be in the CM. Thus, the second JPI may represent the holding ability of the disc page in the CM.

For example, situations may arise in which a job of a very high priority or significance requires a disc page, which is needed to be in the CM for only a very brief period of time. In such a case, the first JPI will be of a high priority to indicate the degree of significance of the job. This first JPI will be used in determining the disc page to be pushed out to make room for the disc page, requested by the high-priority job. However, once the page is transferred to the CM, a lower JPI may be inserted in the JPI field of the PH word, since the transferred page is assumed to be needed in the CP only for a very brief period of time. Thus, the first JPI will be used in the interrogation of the In-Core List and in the determination which disc page, if any, should be pushed out therefrom.

However, once a decision is made to push a certain disc page in order to make room for the requested disc page, when the latter is transferred into the CM and the PH word, associated with the CP in which the DP is transferred, is added to the In-Core List, the second JPI, representing the holding priority or significance, is stored in the JPI field of the PH word. In such a preferred embodiment, each PC word may include a JPI2 field as shown in FIG. 10. After the disc page whose number is in the PR field is transferred to the core page (CP) whose number is in the CPN field, when the PHW of the CP is added to the In-Core List the content of JPI2 of the PC word is loaded into the JPI field of the PHW.

Such a double JPI arrangement enables the system to acquire a page according to one priority criterion, while holding an acquired disc page in the CM according to a different priority criterion. This enables a job with a very high priority to acquire a page which, once acquired, is held only temporarily, as well as to enable a job with a very low priority to acquire a page which, once acquired, is provided with a very high priority, in case the acquired page is required for a very long period of time for an important processor.

From the foregoing it should be apparent that in accordance with the teachings of the present invention, all the information, which is necessary for controlling the execution of the various page requests, which may be received by the paging system of the present invention, is contained in the various PH words, forming the In-Core List and in the PC words, forming the paging Q. The actual execution of any paging request is initiated by interrogating the In-Core List to determine whether it is necessary to push or purge a disc page from one of the core pages to make room for the requested disc page and, if so, from which core page such disc page purging should occur.

The interrogation is actually executed by interrogating the status of various fields of the PH words, which form the In-Core List, and/or by comparing them to information received from the control unit 16, such as for example the first JPI, hereinbefore referred to. Similarly, interrogation of various fields of the PC words which form the paging Q are utilized in controlling the page pushing or page transferring, in response to the various interrupts which are received from the disc controller.

Although the actual execution of a complete paging operation may involve a relatively large number of steps, each step by itself is relatively simple. A step may involve the comparing of the contents of two fields and/or the transferring of the content of one field to another field, depending on the particular function of the step which is performed. From the foregoing description, it should be appreciated by those familiar with the art that various, presently known data transfer or comparison control techniques may be employed in the implementation of the paging control unit 10 of the system of the present invention to control the execution or performance of the various steps which are necessary for the paging operations, as hereinbefore described. Thus, the following description should be regarded only as one example of an implementation of such control circuitry.

Figure 11:
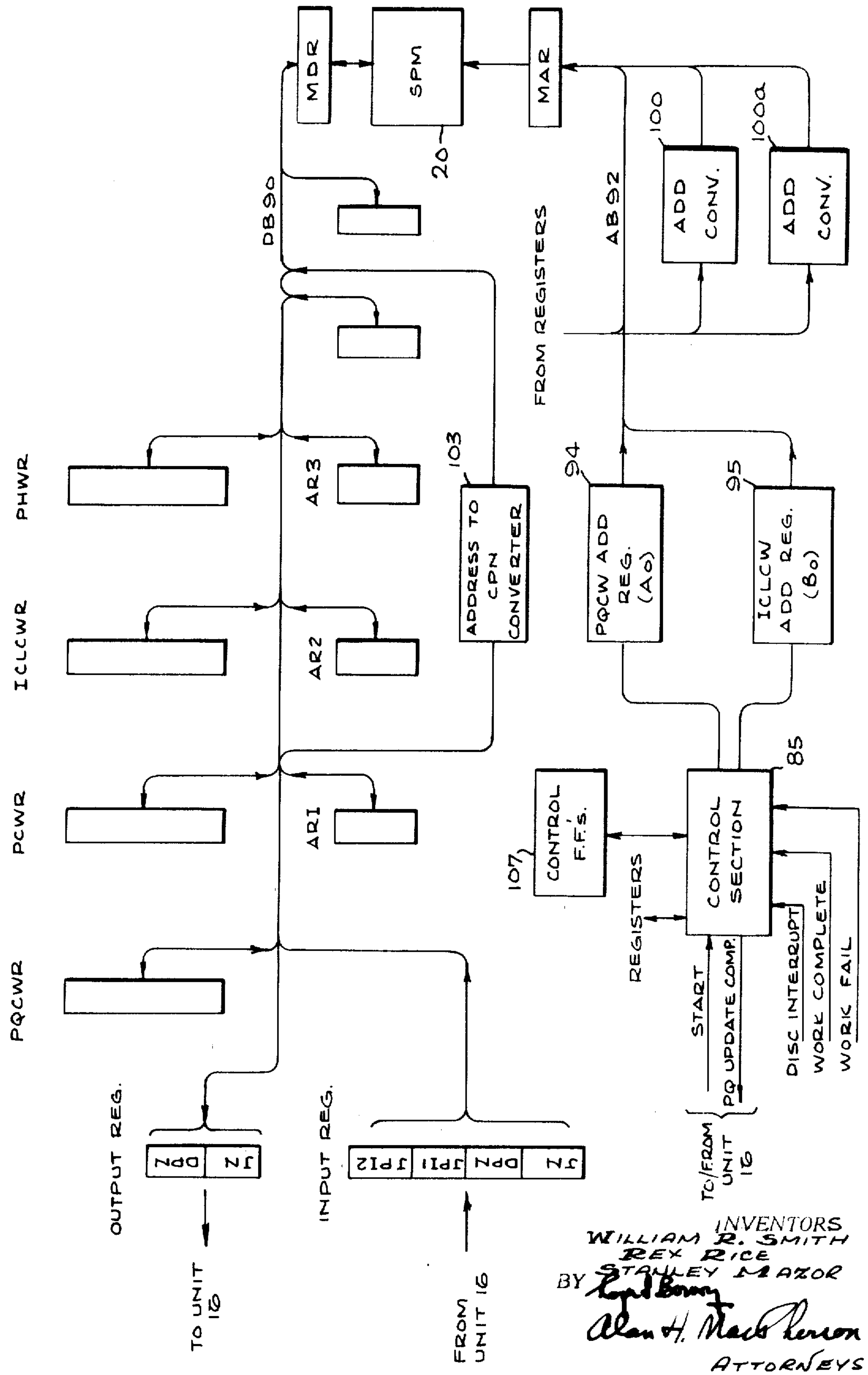
FIG. 11 is a block diagram of the Paging Control Unit, shown in FIG. 1.

Reference is now made to FIG. 11 which is a simplified diagram of the paging control unit 10 (see FIG. 1) and the special purpose memory, SPM20, which in FIG. 11 is shown associated with its address register designated MAR, and its data register, designated MDR. The unit 10, as shown, includes various circuits which are necessary to explain the operation of the novel invention in conjunction with several examples to be described hereafter. It should however be appreciated that the diagrammed circuits are shown for explanatory purposes, rather than to limit the invention. The actual circuits which are required depend on the particular performance requirements of the invention.

Furthermore, since the present invention can be incorporated in a multiprocessor time-shared system, many of the functions to be performed by the circuits shown in FIG. 11, may actually be performed by circuits in the overall system. The unit 10 is assumed to include an input register to which any paging request from unit 16 is assumed to be supplied. The unit 10 also includes an output register into which a number of a job and a number of a disc page which has been transferred to the CM, in response to a previous request may be supplied for subsequent supply to the control unit 16.

The input register is shown including a JN field, a DPN field, a JPI1 field and a JPI2 field. The requested disc page is assumed to be loaded in DPN field, while the number of the job for which the page is requested is loaded in the JN field.

Field JPI1 is loaded with the first JPI, used for page acquisition purposes, while field JPI2 is loaded with the second JPI, assumed to be used for page-holding purposes, as hereinbefore explained in connection with the preferred embodiment.

The execution of a paging request, is assumed to start when a START signal is supplied to a control section 85 of the control unit 10 from control unit 16. Once the START signal is received, the content of the input register is not changed until a PQ-Update-Complete signal is supplied by the control section 85 to the control unit 16, to indicate that the unit 10 is ready to receive a new page request. Control section 85 includes all the control logic, necessary to control the automatic operation of the present system. This section will be described hereafter in detail.

As shown in FIG. 11, the paging control unit 10 is assumed to include a plurality of registers. A separate register is included for each type control word, which is shown in FIG. 2, with the registers' designation in FIG. 11 comprising the words' nomenclatures, followed by the letter R. These registers, which hereafter may also be referred to as working registers, are used to hold their respective control words, while their fields are either interrogated or their content modified, as will be explained hereafter. Thus, for example, PQCWR is used to hold the PQCW word when the latter is read out from the SPM20. Similarly, each of registers PCWR, ICLCWR and PHWR is used to temporarily hold its corresponding control word, when the latter is read out from the SPM20, in order to determine the content of any of its field or to modify the content of such fields. Since the control words are assumed to be of equal bit length, the working registers are likewise of equal length. Each working register, such as PQCWR, is assumed to comprise of fields, such as ICLT and ICLB, which correspond to the fields of the control word which may be loaded therein.

The paging control unit 10 also includes several auxiliary registers, designated in FIG. 11 by AR1–AR5. Whenever, in the execution of a paging operation, two control words of the same type have to be operated upon, such as by transferring the content of a field of one of the words into the field of another word, since for each type control word, only one working register is included, one of the auxiliary registers is used to temporarily hold the content of the field of the other control word. For explanatory purposes each of AR1–AR3 is long enough to hold the address of one of the core pages, while AR4 is of a length sufficient to hold any DPN and AR5 is long enough to hold any JN.

The various registers are interconnected to each other and to the MDR by means of a two-way data bus (DB) 90. This bus is used to transfer the content of the MDR to any of the registers, as well as to transfer the content of one register to another, and to the MDR for subsequent storing in the SPM20. The control unit 10 is further shown to include a main address bus (AB) 92 which is connected to the MAR of SPM20. This bus is used to supply addresses to the MAR from any of the registers as well as from two special-purpose address registers, designated in FIG. 11 by numerals 94 and 95. These include a PQCW address register 94, which, when properly activated by an enabling signal from control section 85, supplies the MAR with the specific address of the PQC word stored in SPM20. As shown in FIG. 2 this address is assumed to be A0. Similarly, address register 95 represents an ICLCW address register, which when activated by section 85, supplies the MAR with the address of the ICLCW, which as shown in FIG. 2 is assumed to be BO. The address of any other of the control words which may be necessary for the execution of a paging operation, is assumed to be supplied to the MAR from the content of one of the registers of the control unit 10, or from either of two address converters 100 and **100*a***.

Basically, these address converters are used to generate addresses of selected control words as a function of address supplied thereto. For explanatory purposes let it be assumed that for each core page a single PC word is present in SPM20. Thus, address register 100 may be assumed to supply the address of a PC word such as A1, which is assumed to be associated with CP1 when the address, B1 of PHW1, which is associated with CP1 is supplied thereto. Similarly, address converter **100*a*** is assumed to convert the number of a core page, such as CP2, into the address, of the PHW associated with such core page, such as B2.

The control unit 10 is assumed to further include an address-to-number converter 107 which is assumed to convert the address of a PHW, such as B3 into the number of the core page, associated with the PH word. It should be appreciated that address converters are well known in the art and that due to the one-to-one relationship between a PHW and core page number, known circuit design techniques may be used in the implementation of these converters. In addition to the foregoing, the control unit 10 further includes a plurality of control flip-flops (FFs), which will be described hereafter. In FIG. 11 these FFs are designated by block 107.

The addressing of the SPM20 as well as the controlling of its Read and Write operations and the transferring of the full content of one register to another, or the content of a field of a register to a corresponding field of another register are assumed to be controlled by control signals, supplied by the control section 85. As previously stated, the latter is assumed to include control circuitry, so that once the START signal is received from the control unit 16, the circuitry automatically provides a sequence of control signals to the various hardware of the control unit 10 as well as to the SPM20 which are necessary for the execution of the received paging request.

Figure 12:
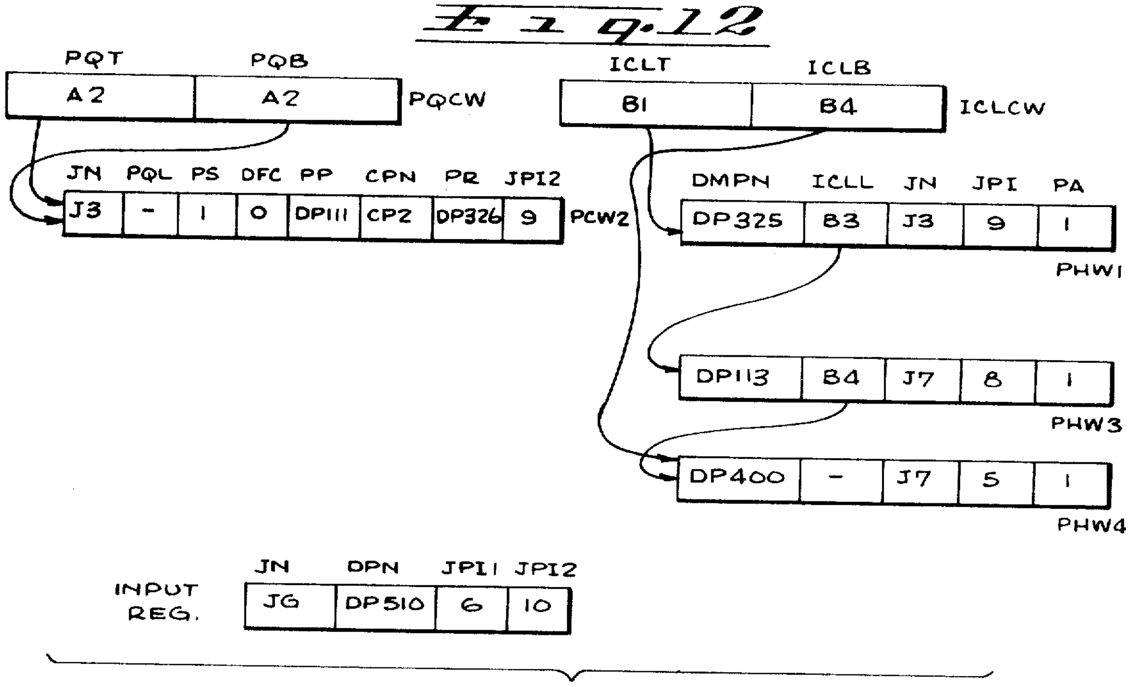
FIGS. 12 and 13 are diagrams of the In-Core List and the Paging Queue which are used to explain a specific example of operation.

The manner in which the circuitry hereinbefore described is used and controlled by the control section 85 may best be explained by referring to a specific example, diagrammed in FIG. 12. In this example, it is again assumed that the CM comprises four core pages. In essence, FIG. 12 is similar to FIG. 4, except that in FIG. 12 each of the PH words is shown including entries in its JPI and PA fields. As shown, each PA field is assumed to be set by storing a binary 1, which indicates that the core page, associated with the particular PH word, is active by storing a meaningful disc page. Therefore, the core page cannot be used for storing a new disc page before a determination is first made whether the disc page in the particular core page has to be pushed out and restored in the DM. The JPI fields of PHW1, PHW3 and PHW4 are shown containing entries 9, 8 and 5, respectively. For explanatory purposes, it is assumed that the higher the number, the higher the holding priority of the disc page in the core memory.

As diagrammed in FIG. 12, the PS field of PCW1 is shown storing a 1 which, as hereinbefore assumed, indicates that the pushing phase of the paging request has been completed and that only the page transferring operation need be performed therefor. That is, the 1 in the PS indicates that DP111 in the PP field has been pushed out from CP2 and that only the transferring of DP326 from the DM to CP2 in the CM is necessary to complete the paging request, represented by the content of PCW1. In FIG. 12, it is further assumed that the input register of the paging control unit 10 stores a request for the transfer of DP510 for J6. The request is assumed to include a page acquisition priority of 6 and a page-holding priority of 10, as represented by the entries in JPI1 and JPI2, respectively.

Under such conditions, when the paging request is received and the START signal is provided to the control section 85 (see FIG. 11) of the control unit 10, the first series of steps which is performed includes the steps needed for the interrogation of the In-Core List to determine which, if any, DP pages should be pushed out to make room for the requested DP510. The first step involves the retrieval of ICLCW from the SPM20, and its storage in PQCWR (see FIG. 11). This is accomplished by activating the address register 95 to supply the address BO of ICLCW (see FIG. 2) to the MAR. Then, a Read signal is applied to the SPM to retrieve the ICLCW from the SPM memory and load it in the MDR. Thereafter, the content of the MDR is transferred to the PQCWR, by supplying an Unload signal to the MDR and a Load signal to the PQCWR.

Once the ICLCW is in the PQCWR, the content B1, in the ICLT field is read into the MAR in order to retrieve the first PH word, i.e., PHW1 from the SPM and load it into the PHWR. Again, it is apparent to those familiar with the art, that the transfer of B1 to the MAR may be accomplished by supplying an Unload signal to the ICLT field of PQCWR, and a Load signal to the MAR. Thereafter, a Read signal is supplied to SPM20, resulting in the loading of PHW1 in the MDR. This is followed by an Unload signal to the MDR together with a Load signal to PHWR.

Once PHW1 is in the PHWR, the PA field is interrogated. Found to be a 1, thereby indicating an active core page, the content of the ICLL field of the PHWR, which contains the address, such as B3, of the next PH word in the In-Core List is transferred to one of the auxiliary registers, such as AR1, and PHW1 in PHWR is restored in the SPM20 at its address, B1. Thereafter, B3 in AR1 is loaded in the MAR, followed by a Read operation which results in the retrieval of PHW3 from the memory into the MDR. This is followed by transferring PHW3 from the MDR to the PHWR.

Again, the PA field of PHWR is interrogated. Since in the particular example the PA field of PHW3 is also a 1, thereby indicating an active core page, the address B4 in the ICLL field is transferred to one of the auxiliary registers. This is done in order to be able to retrieve the next PHW word in the In-Core List. Thereafter, PHW3 is returned to the memory. This process proceeds until the PA field of one of the retrieved PH words, which is located in the PHWR, is found to be inactive.

If, however, none of the PH words has an inactive PA field, as is the case in the example of FIG. 12, the top PH word in the In-Core List, i.e., PHW1 is again retrieved and now its JPI field is interrogated. Actually, the interrogation is performed by comparing the number in the JPI field of the retrieved PH word, which is in the PHWR, with the content of the JPI1 field of the input register, which stores the acquisition priority indication of the page request. In this particular example, the acquisition priority of six (6) of the page request is less than the job priority indication of nine (9) in PHW1. Consequently, core page CP1, associated with PHW1 cannot be used since, the holding of DP325, stored therein, is greater than the acquisition priority of the page request. As a result, PHW1 is again restored in memory without any changes and the next PHW word, i.e., PHW3 in the In-Core List, is retrieved.

After PHW3 is loaded in PHWR its JPI field content which is 8, is compared with the 6 in the JPI1 field of the input register. Again, since 8 is greater than 6, the content of PHW3 could not be altered and, therefore, it is returned to SPM20 and the next PH word, i.e., PHW4 is retrieved. When the five (5) contained in its JPI field is compared with the 6 in JPI1, since the latter is the greater of the two, it indicates that the acquisition priority of the requested page DP510, is greater than the holding priority of disc page DP400, in CP4 which is associated with PHW4. As a result, a delete PH word operation is performed in response to a sequence of signals, supplied by the control section 85. Before the delete PH word operation is performed the disc page number, DP400 and the address of the word, B4, are transferred to two of the auxiliary registers. If desired, the job number, such as J7, in the JN field of the deleted PH word may be supplied to the control unit 16 to indicate that a disc page for the particular JN has been selected for deletion from the CM. Also, as part of the delete operation, the conversion table (see FIGS. *9a–9c*) may be updated by deleting DP400 from the special word which is associated with CP4.

As previously explained, a delete PH word from the In-Core List involves the addition of a PC word to the paging Q (PQ). In accordance with the teachings of the present invention, the control section 85 activates the address register 94 (see FIG. 11) in order to supply the MAR with the address, BO of PQCW. Once PQCW is retrieved from the memory and loaded in its PCWR, the content of the PQB field is used to provide the address to the MAR of the last PCW word in the paging Q. This word is then retrieved and loaded into the PCWR. In the particular example, diagrammed in FIG. 12, the content of the PQB field is A1, representing the address of PCW1, which happens to be the top PC word in the paging Q, since PCW1 comprises a single word in the paging Q. After PCW1 is retrieved and loaded into PCWR, the address of a selected PC word is generated. In the present example, in which it is assumed that each core page or its PH word has associated therewith a single PC word, since PHW4 is deleted, its address B4 is supplied to converter 101 to generate the address, A4 of PCW4. A4 is then loaded into the PQL field of PCWR in which PCW1 is located. PCW1 is then returned to the memory. The address, A4 of the selected PC word is also entered into the PQB field of PQCWR in order to point to the new last word in the paging Q. The content A4, of PQB is then supplied to the MAR and PCW4 is retrieved and loaded in the PCWR.

Figure 13:
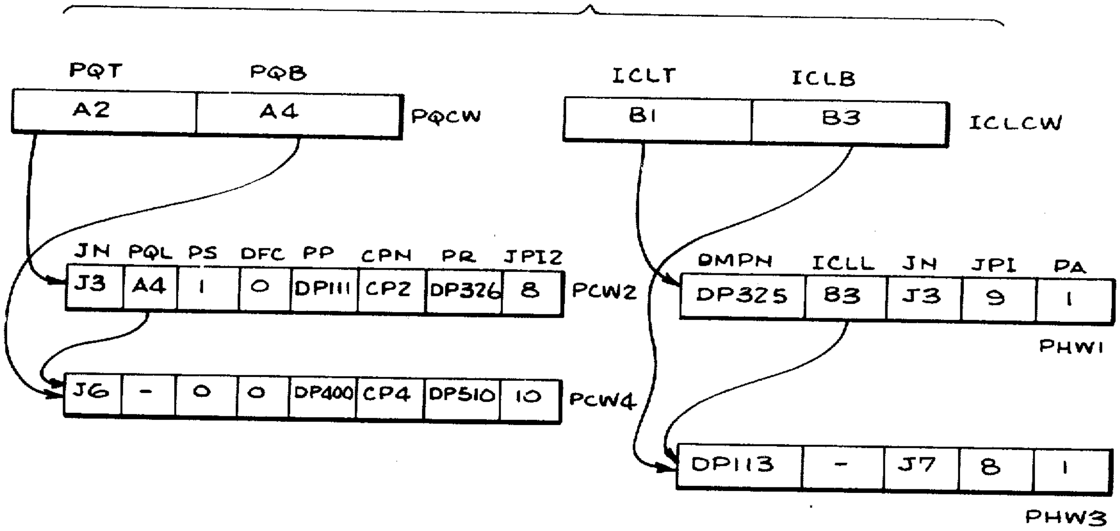

At this point in the operation, the input register still holds all the information of the paging request, the PCWR holds PCW4 which was added to the PQ and the numbers of the disc page to be pushed out (DP400) as well as the address, B4 are in the auxiliary registers. The contents of the various fields of the input register and the auxiliary registers are loaded into various fields of the PCWR in order to form the necessary entries for PCW4, as shown in FIG. 13. That is, J6 from the JN field of the input register is transferred to the JN field of the PCWR to indicate that the paging request is performed for J6. The disc page DP500 in the DPN field of the input register is transferred to the PR field of the PCWR to indicate the actual number of the requested disc page. DP400, located in one auxiliary register, such as AR4, is loaded into the PP field. B4 is another register such as AR1 is supplied to converter 103 to generate CP4 which is loaded into the CPN field.

The DFC field is set to zero since no disc failure transfer has been sensed. Also, the holding priority of 10 in JPI2 of the input register is transferred to the JPI2 field of the PCWR. The status of the PS field is then determined. If, when updating the conversion table the RW field is found to indicate a Read only operation on DP400, the PS field is set to a 1 to indicate that only page transferring is required. Otherwise, it is left in a zero (0) state. After the last entry is made, the PCWR contains all the information necessary for PCW4, required for controlling the pushing of DP400 from CP4 and/or the transferring of DP510 thereto for J6. Thus, after all the entries are made, the content of PCWR, representing PCW4, is stored PHW1 SPM30 at the address A4. PCW1

For the particular example, at this point in the operation, the contents of the various control words and the manner in which they are interlinked is as represented in FIG. 13. Basically, the In-Core List comprises PHW1 and PHW3 while the paging Q consists of PCW2 and PCW4. Since the PS of PCW1 stores a binary 1, in accordance with the previous assumptions, it indicates that the page-pushing phase has been completed and only page transferring is required. That is, it indicates that only the transferring of DP326 to CP2 has to be performed in order to complete the page request for J3. On the other hand, since the PS field of PCW4 stores a 0, it indicates that page pushing, as well as page transferring has to be performed in order to complete the request for J6. The page pushing involves the transferring of DP400 from CP4 to the DM, while the page transferring involves the transferring of DP510 from the DM to CP4. Clearly, page transferring can occur only after the page-pushing phase has been completed.

As previously indicated, in accordance with the teachings of the present invention, disc interrupts are assumed to be supplied to the paging control unit 10 from disc controller *12c* (see FIG. 1). In connection with FIG. 11, it is assumed that when a disc interrupt is received by the paging control unit 10, it is supplied to its control section 85. Therein this signal initiates the interrogation of the paging Q to determine whether there is any work which can be done in response to the particular interrupt. Herein, work is defined as either page pushing or page transferring. When the disc interrupt is received, address register 94 is activated to provide the address A0 of PQCW which is retrieved. Thereafter, its PQT field is used to provide the address, such as A2, of the top PCW (PCW2) in the paging Q. When the top PCW is retrieved, the contents of its PP and PR field are separately compared with the disc interrupt and the content of the PS field is used to determine whether a page-pushing phase or a page-transferring phase may be performed, in response to the particular disc interrupt.

Figure 14:
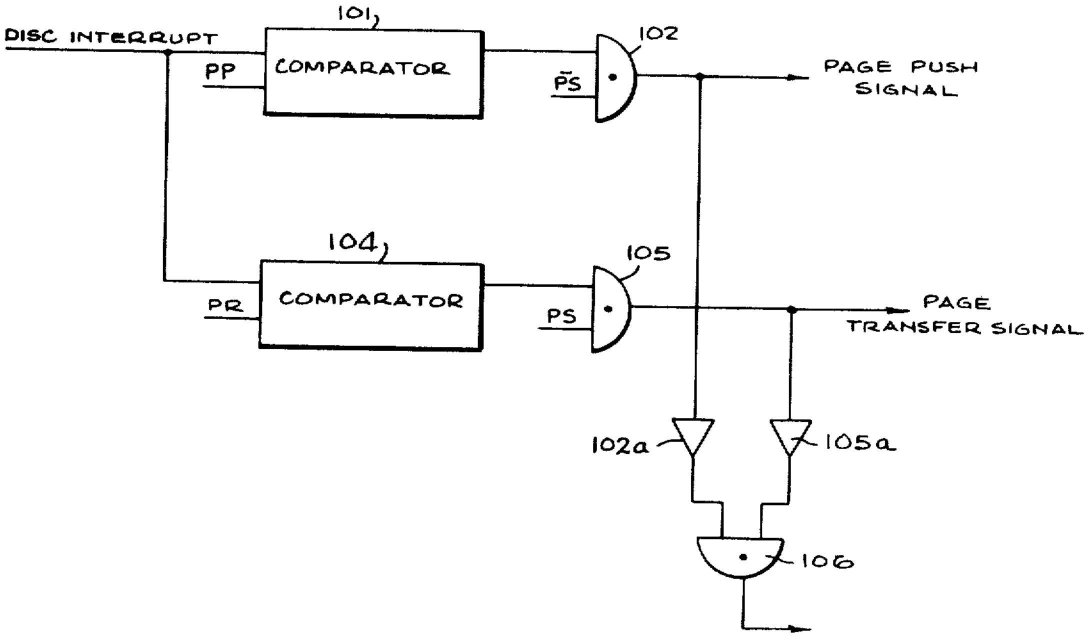
FIG. 14 is a block diagram of circuitry employed when the Paging Queue is interrogated.

This aspect may better be explained in conjunction with FIG. 14 to which reference is now made. Assuming that the disc interrupt is of the 300 series, the interrupt is supplied to a comparator 101 to which the content of the PP field of the PCW in the PCWR is also supplied. If the content of the PP field is also in the 300 series, comparator 101 provides a true output which is supplied to an AND-gate 102, which is also supplied with the complement of the content of the PS field, as represented by $\overline{PS}$. Thus, if the PS field contains a 0 ,and the output of the comparator 101 is true, the output of gate 102 is true. Such an output represents a page push command signal.

Such a page push command signal is supplied to the control gates 22 (see FIG. 1) to indicate that the data transfer to be performed is one from the CM13 to the DM12. Also, the page push command signal is supplied to the CM13 as a Read signal and to the DM12 as a Write signal. At the same time, the content of the PP field of the PCWR is supplied as the address to the DM12 while the content of the CPN field is supplied as an address to the CM13. This enables the two memories and the gates 22 to transfer or read out the content of CP2 from CM13 through the gates 22 to the DM12. The page push command signal from the AND-gate 102 is also used to change the state or content of the PS field of the PCWR to a 1, thereby indicating that the next operation which has to be performed for the particular request involves a page transfer operation.

As seen from FIG. 14, the disc interrupt is also supplied to a second comparator 104 to which the content of the PR field of the PCWR register is also supplied. If the two result in a positive comparison, i.e., the page number in the PR field is in the same series as the disc interrupt, the output of the comparator 104, which is supplied to an AND-gate 105 is true. The other input to the AND-gate 105 is the content of the PS field which is a 1 if page transferring is to be performed. Consequently, when the two inputs to the AND-gate 105 is true, which represents a page transfer command signal. This signal, like the page push command signal, is supplied to the gates 22 as well as to the CM13 and to the DM12. However, in this instance, the page transfer command signal acts as a Write signal for the CM13 and a Read signal for the DM12, so that the disc page, whose number is supplied to the DM12 as an address from the PR field of the PCWR is read out into the CM13 in a core page, whose number is supplied from the CPN of PCWR to the CM13, as a core page address.

The outputs of gates 102 and 105 are also supplied to an AND-gate 106 through inverters 102*a* and 105*a*, respectively. Thus, if the outputs of both gates 102 and 105 are false, the output of gate 106 is true, representing a No Work signal. This signal is used by the system to retrieve the next PC word in the paging Q to determine whether any work can be performed therefor.

When in response to a page transfer command signal, a disc page is fully transferred to a core page, a page transfer completion signal is supplied to the control section 85. In response to this signal, the PH word, associated with the core page whose number is in the CPN field of the PCWR, is retrieved from SPM20 and loaded into its respective PHWR. Thereafter, the contents of various fields of the PCWR are loaded into corresponding fields in the PHWR. Then, the PH word, located in the PHWR is added to the In-Core List, as hereinbefore described.

In this particular example, assuming that at the stage of operation, represented by FIG. 13, a disc interrupt in the 300 series is received, PCW1 is the first to be retrieved and loaded into the PCWR. Since the content of its PR field is DP326, which is in the 300 series, and since the PS field is a binary 1, gate 105 (see FIG. 14) is true, thereby providing the page transfer command signal. Thus, the two memories and the gates are activated in such a way that DP326 is read out from the DM12 and loaded into CP2 of the CM13.

When this is completed, and the page transfer completion signal is received by the control section 85, since the CPN field stores CP2, PHW2, associated with CP2, is retrieved and loaded into PHWR. The number, DP326 in the PR field of the PCWR is transferred to the CMPN field in the PHWR, the number J3 in the JN field in the PCWR is loaded into JN field of the PHWR, while the holding page priority indicator in the JPI2 field of PCWR, represented by the number 8, is loaded into the JPI field of the PHWR. Then, the content of the PHWR, which now represents PHW2, is transferred back and stored into the memory SPM20.

Figure 15:
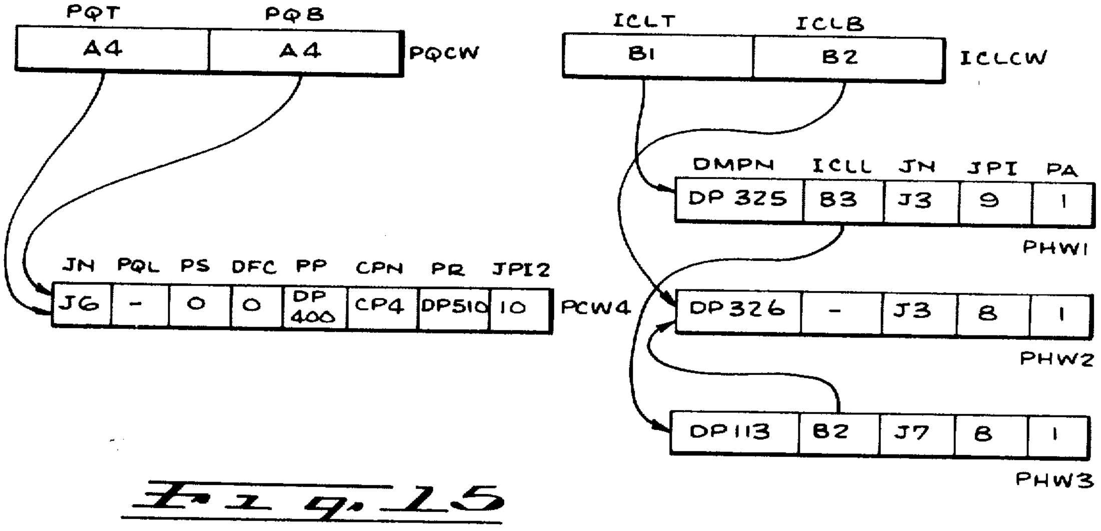
FIGS. 15 and 16 are additional diagrams, used for the explanation of the specific example of operation in conjunction with FIGS. 12 and 13.

Also, the contents of the ICLL field of the previous last PH word in the In-Core List, i.e., PHW3 and the contents of the ICLB field of the ICLCW are modified to provide the proper linkage between the various PH words in the In-Core List to represent PHW2 as the new last PH word in the list. Such an arrangement is shown in FIG. 15, to which reference is now made. After the PHW2 is added to the In-Core List, the contents of the JN and PR fields of PCWR, i.e., J3, and PR326 are transferred to the output register for supply to the control unit 16 to indicate to the latter that the previous request for the transferring of DP326 for J3 has been fully executed. Then, PCW2 is deleted from the paging Q, so that thereafter, the paging Q only includes PCW4.

Assuming that no other paging requests are received, from the foregoing description, it should thus be appreciated, that when the first 400-series disc interrupt is received, a page push command signal (see FIG. 14) is provided to control the pushing of DP400 from CP4 back into the DM, while at the same time the PS field of PCW4 is set to a binary 1. Then, after the page pushing is completed, when the disc interrupt 500 series is received, since the page pushing was completed, the PS field is 1 and, since the PR field contains DP510, in the 500 series, the comparator 104, (see FIG. 14) provides a true output. Consequently, gate 105 is enabled to provide the page transfer command signal.

Figure 16:
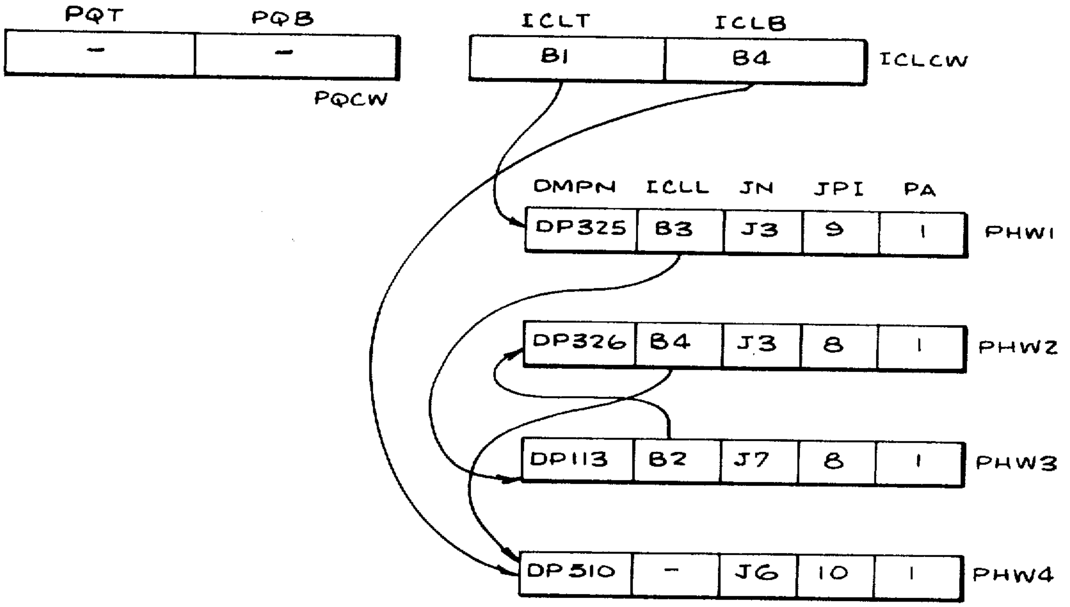

When the page transfer completion signal is received, indicating that DP510 has been transferred to CP4 in CM13, CP4 in the CPN field is utilized to retrieve PHW4 which is loaded into the PHWR. Once this is accomplished, J6, DP510 and the number 10 from fields JN, PR and JP12, of the PCWR are loaded into fields JN, DMPN and JPI of the PHWR. Then, PHW4, which at this point in the operation is represented by the content of PHWR, is added to the In-Core List (see FIG. 16) in a manner as hereinbefore described. This is followed by deleting PCW4 from the paging Q, after providing J6 and DP510 to the control unit 16 to indicate that the page request for J6 has been completely executed. The status of the various control words at this point in the operation is as shown in FIG. 16.

It should be pointed out that for the particular example, hereinbefore explained in conjunction with FIGS. 11–16, with the request for the transferring of DP510 for J6, (see FIG. 12), two JPI's were supplied therefore. The first JPI of 6 was used for acquiring space in the CM. However, once it was acquired, and the page transfer operation was completed, the second JPI of 10 was stored in the JPI field of PHW4 (see FIG. 16), thereby indicating that the holding priority of the requested page is higher than the acquisition priority therefor. Hereafter, only a paging request in which the acquisition priority is equal or greater than 10 could page DP510 be pushed out from CP4 in which it has been stored.

It should further be pointed out that the addition of a PH word to the bottom of the In-Core List is relatively simple. It involves the storing of the address of the newly added PH word in the ICLL field of the previous last word in the In-Core List, and the updating of the ICLB field of ICLCW, by storing the address of the new last PH word in the list.

For the particular example, B4 of PHW4 is stored in the ICLL field of PHW2, which was previously the last word in the In-Core List. Also, B4 is loaded into the ICLB field of the ICLCW. The deletion of a word, such as a PC word, from a paging Q or a PHW from an In-Core List, is somewhat more complicated and may require the temporary holding of addresses of several words in the Q or list, as the case may be, in order to provide the proper linkages. It is for this purpose that several auxiliary registers AR1, AR2 and AR3 are incorporated in the paging control unit 10 (see FIG. 11).

Figure 17:
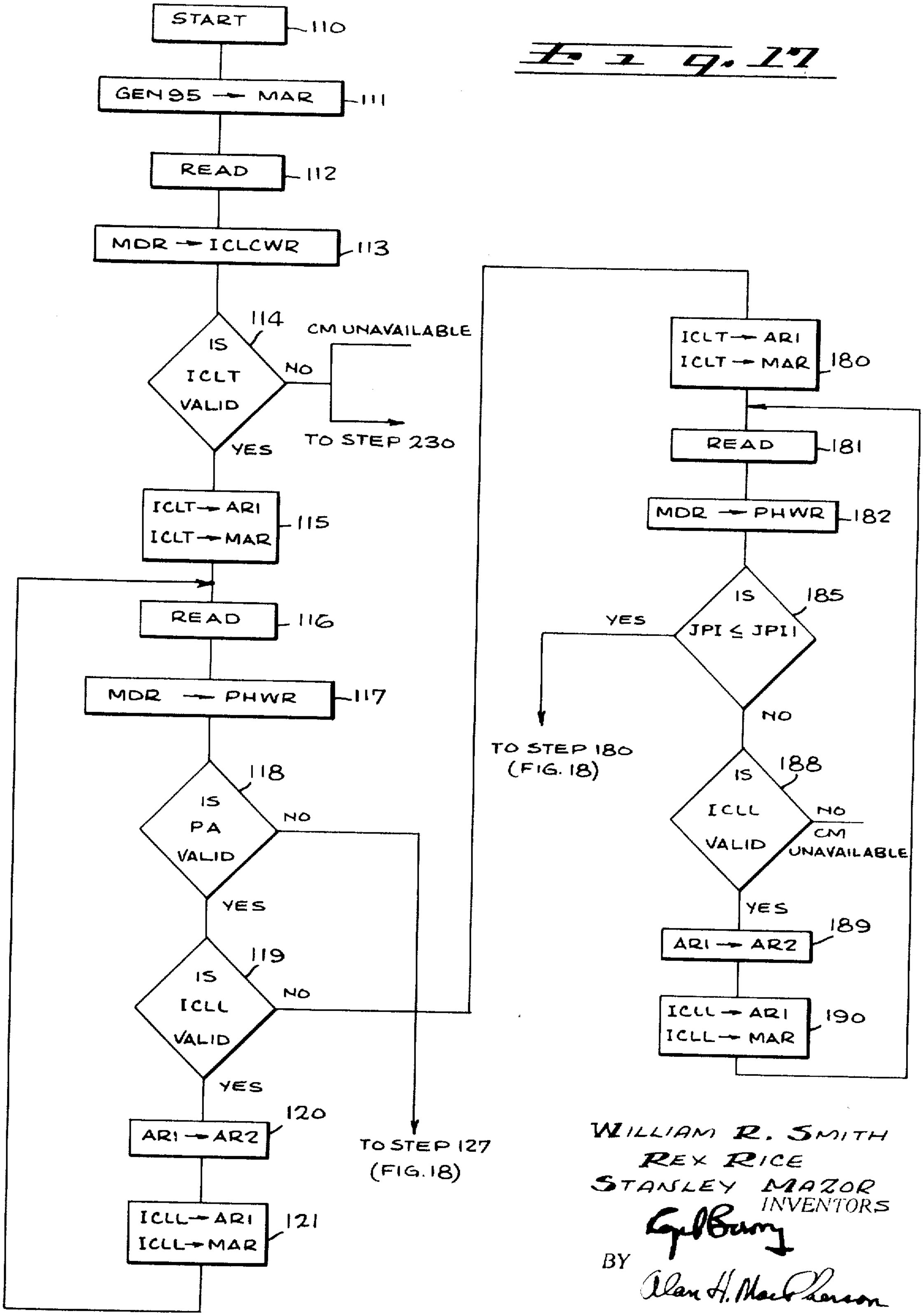
FIGS. 17 through 20 are detailed flow charts of steps performed by different embodiments of the present invention.
Figure 18:
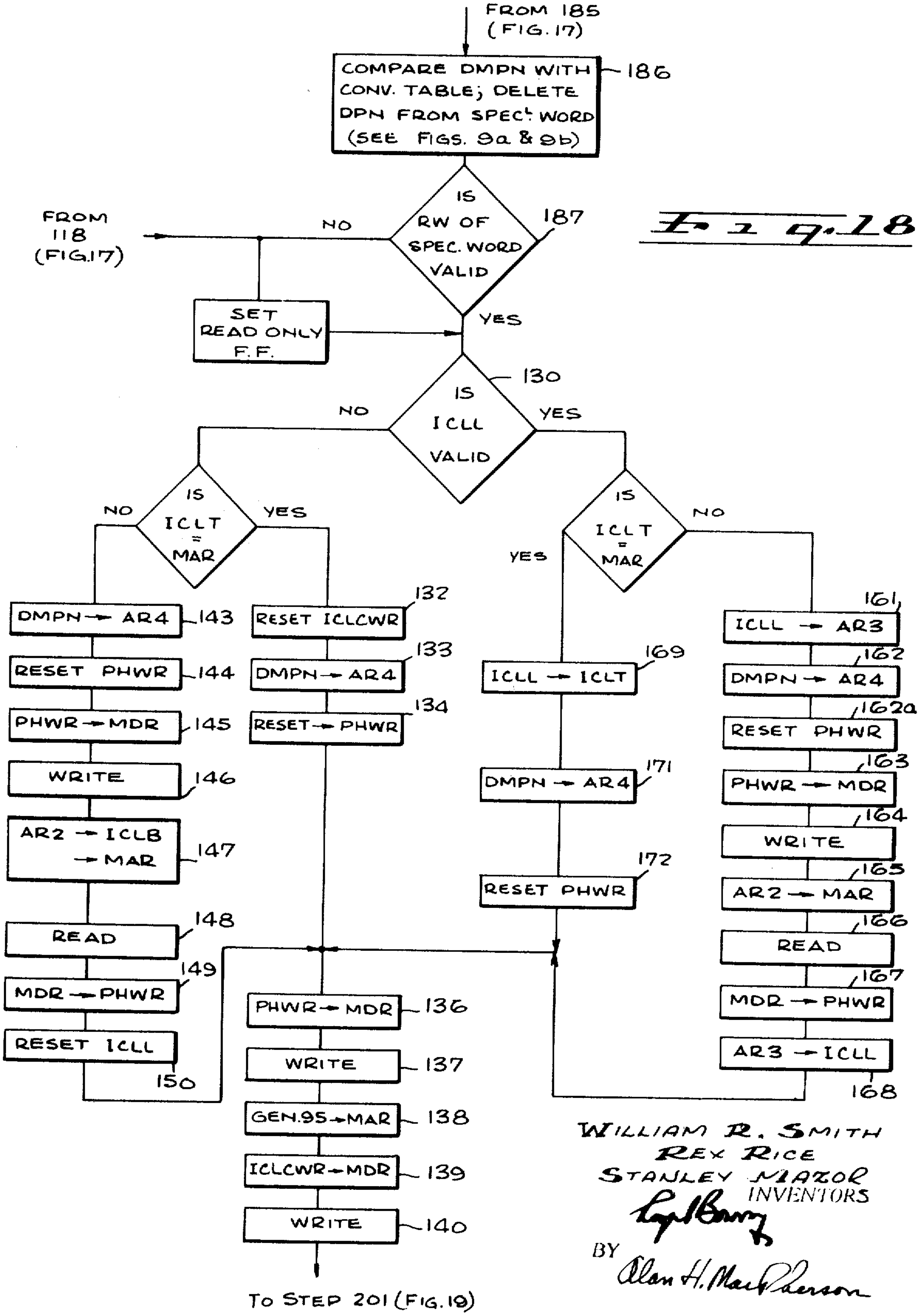

The steps which the paging control unit 10 has to perform to control the paging in accordance with the teachings of the present invention, may further be summarized in conjunction with FIGS. 17–20, which are detailed flow charts of the type well known by those familiar with the art. In these flow charts the nomenclature hereinbefore used for the various memories, registers and control words are also employed. FIGS. 17 and 18 represent a relatively detailed flow chart of the various steps which the control unit 10 performs in interrogating the In-Core List, once a paging request is received. This is done to determine the core page from which a disc page should be pushed out in order to satisfy the paging request. As indicated in the foregoing example, in FIGS. 17 and 18 it is assumed that when a paging request is received, each PHW is interrogated to determine the status of its page activity (PA) field. Only if all the PH words have active PA fields is the In-Core List interrogated once more by interrogating each PH word therein and comparing the contents of its JPI field with the content of the JPI1 of the input register.

Once a paging request is received and is loaded into the input register a START signal is supplied by the control unit 16 (see FIG. 11). The START signal is designated in FIG. 17 by block 110. Then, the control section 85 provides a sequence of control signals in order to transfer the ICLCW from the SPM20 into the ICLCWR. As represented by block 111 in FIG. 17, the control section 85 supplies an activating signal to address generator 95 to cause the latter to supply the address BO of the ICLCW in the SPM20 to the MAR. The MAR is activated by a Load signal from the control section to receive the address. This is represented by Gen → MAR.

Once the address of ICLCW is in the MAR, the control section 85 provides a Read signal to SPM20, the Read signal being represented by block 112. As a result, the ICLCW is retrieved from the memory and loaded into the MDR Once in the MDR, the control section provides an Unload signal to the MDR and a load signal to the ICLCWR, as represented by block 113, thereby transferring the ICLCW from the MDR to its corresponding working register.

After the ICLCW is loaded in its corresponding register, it is necessary to determine whether the In-Core List contains any PH words. This determination is made by interrogating and determining whether the ICLT is valid (block 114). Each field of each working register is assumed to have an activity bit which is set when the field contains an address. Thus, the validity of any field is determined by determining the status of its activity bit. The ICLT is not valid only if the In-Core List is completely empty which is the case if for each core page in the CM, a page-transferring request is in process of being executed, a situation which will not arise very often. If, however, such a situation arises, and the ICLT is found to be invalid, a CM Unavailable (CMU) signal is produced.

Assuming however, that the ICLT is found to be valid, thereby indicating that there is at least one PH word in the In-Core List, the control section 85 provides a control signal to the ICLCWR to unload its ICLT field into the MAR as well as to Unload it into auxiliary register AR1 (block 115). The transfer of the content of the ICLT to the MAR is done in order to transfer the address of the top PHW in the In-Core List to the MAR for readout $_{\text{H}}$ rposes, while the transfer of the content of the ICLT, representing the address of the top PHW in the In-Core List to the AR1 is done in case such address is later necessary when a PHW is deleted from the In-Core List.

In the example, hereinbefore explained in conjunction with FIGS. 12–16, this address is B1 (see FIG. 12). Thereafter, the control section 85 supplies the SPM20 with a Read signal (block 116). This is followed by the unloading of the content of the MDR into the PHWR (Block 117). In the foregoing example it is PHW1 which is loaded into the PHWR at this point in the operation. Once the first PHW is in its corresponding register, its PA field is interrogated (diamond-shaped block 118). As previously assumed, the PA field is assumed to be active or valid when a 1 is stored therein to indicate that the core page cannot be used to store another disc page until the disc page already stored therein is removed therefrom.

Assuming that in interrogating the PA field it is found to be active or valid, it is necessary to retrieve from memory a following PH word in the In-Core List, if the previously retrieved PHW is not the last in the In-Core List. This determination is made by interrogating the validity of the ICLL field of the PHW which is now in the PHWR (block 119). The ICLL is valid whenever an address of a following PHW is stored in it, such as for example the address B3 in PHW1 (see FIG. 12) which points to the following PHW3 in the In-Core List. Assuming that the ICLL is valid, the control section 85 causes the content of AR1 to be transferred to AR2 (block 120). This transfer is necessary to insure that sufficient addresses of PHW's are available in case they are needed for proper PH word deletion from the In-Core List, as will become apparent from the following description.

After the latter-mentioned transfer, the control section 85 supplies an Unload signal to the ICLL field of the PHWR and Load signals to the MAR and the AR1 (block 121). In the foregoing example, it is address B3 which is transferred. Once the address of the following PHW word is in the MAR, Read signal is again supplied by the control section 85 to the SPM20, as represented by block 116 in order to retrieve the next PHW in the list. This close loop sequence of steps continues until a PA field of one of the PH words in the In-Core List is found to be invalid or inactive, or until the last PH word is retrieved, so that when its ICLL field is interrogated it is found to be invalid, thereby indicating that the end of the list has been reached.

In the former case, if the PA field of any of the words is found to be inactive, that particular word is deleted from the In-Core List. However, in the latter case, in which the end of the In-Core List is reached without discovering an inactive PA field, the In-Core List is again interrogated by retrieving each of its PH words in succession and comparing the contents of its JPI field with the content of the JPI1 in the input register (see FIG. 12). This is the case in the example hereinbefore explained in conjunction with FIGS. 12–16 in which it is assumed that the PA field of each of the words in the In-Core List words is valid (see FIG. 12).

For explanatory purposes, let it be assumed that when the In-Core list is interrogated one of its PH words has an inactive PA field. Consequently, after the PA interrogation (block 118) the sequence proceeds to set a Read-only flip-flop (FF) (block 127 in FIG. 18). The state of this FF is used during the addition of a PCW to the PQ to set the PS field since if a PA field of a PHW associated with a core page is invalid, no page pushing is required. After setting the Read-only FF the validity of the ICLL is determined (block 130). The ICLL is invalid if the PHW which is being deleted is the last in the In-Core List.

Assuming this to be the case, it is now necessary to determine whether the PHW which is the last in the In-Core List is also the first in the list, so that by its deletion, the list is emptied, or whether, though deleted PHW is the last in the list it is not the first at the same time, so that after its deletion at least one other PHW remains in the list. This is accomplished by performing the comparison, represented by block 131, in which the content of the ICLT is compared with the content of the MAR. If the two are equal, it indicates that the PHW which is being deleted is also the first or at the top of the list. In such a case, in addition to deleting the PHW, it is necessary to completely reset the ICLCW, an operation represented by block 132.

Thereafter, the DP number in the DMPN field of the PHW which is being deleted is transferred to AR4 (block 133). In the example in conjunction with FIGS. 12 through 16 this content is DP400. This DP number is transferred to AR4 for later insertion into the PP field of the PCW which is going to be added to the paging Q. It should however be pointed out that if the PA field is inactive, the last transfer is not necessary, since no pushing operation is required. Then, the control section causes the resetting of the PHWR (block 134), followed by a series of signals which cause the restoring of the deleted PHW in its corresponding address in the SPM20 as well as the restoring of the ICLC word in the memory. These steps are represented by blocks 136 through 140.

It should be pointed out that at this point in the operation, AR1 stores the address of the PHW which was deleted and thereby the address of the core page, selected for the particular paging of request, while AR4 stores the disc page number which in some cases may have to be pushed out, therefrom. If, however, while comparing the content of the ICLT with the MAR (block 131) it is found that the two are not equal, thereby indicating that the PH word which is being deleted, though being the last in the list is not the first, it is necessary to update only the ICLB field of the ICLCW. In the foregoing example in connection with FIGS. 12 through 16, this update is represented by changing the content of the ICLB from B4 (see FIG. 12) to B3 (see FIG. 13).

Thus, after the comparison, represented by block 131, if the comparison is invalid, the control section 85 provides a sequence of control signals as represented by blocks 143 through 150. In this sequence, the steps (blocks 143–146) which correspond to the steps, represented by blocks 133–137, are first performed. The, the PH word preceding the one being deleted, is retrieved from memory (blocks 147–149), and thereafter, its ICLL field is reset (block 150). In the foregoing example this is performed by deleting B4 from ICLL of PHW3 (FIGS. 12 and 13). Also, the address B3 of the new last word PHW3 in the list, represented by the address in AR2 is loaded into ICLB (see block 147). After the operation which is represented by block 150, the sequence proceeds to perform the steps represented by block 136 and those following it.

If the PHW which is being deleted is other than the last one in the list, i.e., the ICLL is valid (see block 130). It is necessary to retrieve the preceding PHW in the list and insert in the ICLL of the latter the address of the PHW, following the PHW being deleted. On the other hand, if the PHW which is being deleted though not being the last one in the list is the first one in the list, it is necessary to update the ICLT by inserting therein the address of the next PHW, which is in the ICLL of the PHW being deleted. Thus, after the interrogation of the validity of the ICLL, represented by block 130, if ICLL is valid, the control section 85 causes the comparison of the ICLT with the MAR (block 151). If the two are not equal, it indicates that the PHW which is being deleted is not the one at the top of the In-Core List. Thus, the steps represented by blocks 161 through 168 are performed followed by the steps represented by blocks 136 through 140.

On the other hand, if the ICLT is equal to the MAR (see block 151), thereby indicating that the PHW being deleted is at the top of the In-Core List, the ICLT of the ICLCW is updated by transferring thereto the content of the ICLL, an operation represented by block 169. This is followed by steps represented by blocks 171 and 172, followed by the steps, represented by blocks 136 through 140. In the example, hereinbefore explained in connection with FIGS. 3 through 5, in the step represented by block 169 the content, B1 in the ICLL field of PHW2 (see FIG. 3) is transferred to the ICLT of ICLCW (see FIG. 4) as part of the operation of deleting PHW2, from the top of the list so that after its deletion the list is headed by PHW1.

The foregoing description of FIGS. 17 and 18 includes all the steps necessary for the deletion of a PHW from the In-Core list in case a PA field of one PHW in the list is found to be inactive (see block 118). If, however, as in the case of the example, hereinbefore described in connection with FIGS. 12 through 16, all the PA fields are active, when the end of the In-Core List is sensed, the ICLL is found to be invalid, the interrogation of all the PH words in the list is repeated with the JPI of each PHW being compared with the content of JPI1 of the input register. Thus, if a PA field is active and the ICLL is found to be invalid (see blocks 118 and 119 in FIG. 17), the sequence of steps proceeds to load the content of the ICLT, representing the address of the top PH word in the list to both AR1 and the MAR, as represented by block 180. Once the address is in the MAR, a Read signal is supplied by the control section 85, (block 181) followed by a transfer of the content of the MDR to PHWR (block 182). Thus, the top PHW in the In-Core List is again present in the PHWR.

As represented by block 185, the content of the JPI field of the PHW is compared with the content of JPI1 of the input register. Following the foregoing assumptions, if the latter is equal or greater than JPI, the PH word is deleted. Thus, in this case, the system proceeds to perform the step, represented by block 186 in FIG. 18.

Block 186 represents the updating of the conversion table, herebefore explained in conjunction with FIGS. 9*a* and 9*b*. As indicated by the legend in this block, the updating is accomplished by comparing the CMPN of the PH word which, at this point is in the PHWR with the conversion table and by deleting the DPN, such as DP111 (see FIGS. 9*a* and 9*b*), from the special word associated with the core page which is in turn associated with the PH word. In the embodiments in which each special word in the page conversion table includes an RW field, the validity or activity of this field is interrogated (see block 187).

As hereinbefore assumed, when the RW stores a 0, thereby indicating a Read-only operation, the RW is assumed to be invalid. As a result, the control section 85 sets the Read-only FF (block 127). After setting the flip-flop or in case the RW is valid, which is the case if some Write operation was performed on the disc page in the core page, the control section 85 proceeds to provide signals to perform the ICLL field as represented by block 130 and the steps following it, which were described.

If however, when comparing JPI with JPI1 (block 185 in FIG. 17) JPI1<JPI, the system checks the validity of the ICLL (block 188) to determine whether a following PH word exists in the In-Core List. If it does not, none of the core pages of the CM can be used to satisfy the page request. Thus, a CM UNAVAILABLE signal is provided by the system. If on the other hand a following PH word exists in the list, i.e., ICLL is valid, the content of AR1 is transferred to AR2 by block 189, which is analogous to the operation requested by block 120 in FIG. 17. This is followed by transferring the content of the ICLL to both the MAR and the AR1, (block 190) followed by the Read operation, represented by block 181. Thus, successive PH words in the list are sequentially retrieved from memory and their JPIs are compared with the content of JPI1, until a determination is made that one of the PHWs should be deleted, or until the last of the PHWs is interrogated.

In the foregoing it was assumed that first all the PA fields of the various words in the ICL are interrogated before interrogating any of the JPI fields of these words. It should be apparent however, that the flow chart may be modified so that as each word in the ICL is retrieved, both its PA and JPI fields are successively interrogated to determine the availability of the core page associated with the particular word to store the requested disc page. Also, is desired, the flow chart may be modified so that if in the comparison of JPI with JPI1, represented by block 185, JPI=JPI1, the address of the word containing JPI may be stored, and that particular word assigned to satisfy the request only if none of the succeeding words in the ICL has a JPI which is smaller than JPI1.

The steps represented in the flow charts of FIGS. 17 and 18 are those which the novel system of the present invention performs in interrogating the In-Core List in response to a paging request and in deleting an appropriate PH word from the list as hereinbefore explained. As herebefore described, after the PH word is deleted from the In-Core List, a PC word has to be added to the paging Q. Thus, in accordance with the teachings of the present invention after the Write step, represented by block 140, the control section 85 enables the address generator 94 to provide an address which is loaded in the MAR, as represented by block 201 in FIG. 19. Consequently, the address, such as A0, of PQCW is in the MAR.

This operation is followed by a Read operation of SPM20 (block 202), followed by the transfer of the content of the MDR to the PQCWR (block 203). Then the PQB field is interrogated (block 204) to determine whether the field is valid. It is not valid if the paging Q is empty, in which case the PC to be added will be the first and only PC in the Q. Thus, after the interrogation in PQB is invalid, the content of AR1, which at this point stores the address B4 of the PH word, which was deleted, such as PHW4, is supplied to the address converter 100, whose output A4, is then supplied to both the PQB and PQT (block 205).

Thereafter, the content A4 of PQB is loaded in the MAR (block 206). This is followed by a Read operation (block 207) and by a transfer of the content of MDR to PCWR (block 208). Thus, the selected PCW, PCW4 is in the PCWR. Then, the job number in the JN field of the input register is loaded into the JN field of the PCWR (block 210), the content of AR4, which at this point represents the DP number of the page to be pushed out, such as DP400, FIG. 13 is transferred to the PP field (block 211). Thereafter, the content of AR1, representing the address B4 of PHW4, which was deleted, is supplied to converter 103 which generates the number CP4 of the core page associated with the PHW which was deleted. This number is loaded into the CPN field of PQCWR (block 212). The disc page number (DPN) in the input register, representing the requested disc page number, is loaded into the PR field (block 213), followed by loading the content of JP12 of the input register, which represents the page-holding priority indicator, into the JP12 field of PCWR (block 214). The disc fail counter (DFC) field is reset (block **204*a***).

Thus, at this point in the operation the PQCWR contains the number of the job, requesting the page, the disc page to be pushed out, the core page number from which a disc page is to be pushed out, as well as the requested disc page number and the holding priority of such a page. Thereafter, the Read-only flip-flop is interrogated (block 215). This flip-flop is set (see block 127 in FIG. 18) if the RW bit of the special purpose word, associated with the core page whose PHW was deleted indicating a Read-only operation. Thus, if in interrogating the Read-only flip-flop it is found to be in a reset state, thereby indicating that some writing was performed on the disc page which is to be pushed out, the PS field of the PQCWR is not affected and remains in a binary 0 state, to indicate that both page pushing and page transferring has to be performed. If, however, the Read-only FF is set, the PS field is set (block 216) to indicate that the disc page need not be pushed out.

Thereafter, new PCW such as PCW4, in the PQCWR is restored in memory by the steps represented by blocks 221 and 222 followed by restoring the PQC word which is in PQCWR in SPM20, a represented by the steps in blocks 223, 224 and 225. Then, a PQ Update complete signal, represented by block 230 is provided. Thus, it indicates that the updating of the paging Q by the addition of a PCW has been completed.

Reference is made again to block 204. If the PQB is valid, the content of PQB, representing the address of the last PC word in the PQ, such as A2 of PCW2 (see FIG. 12), is loaded in the MAR (block 231). This is followed by a Read step (block 232) and the transfer of MDR to PCWR (block 233). Thus, the last PCW in PQ is in PCWR. Then converter 100 is activated by the content of AR1 to generate the address of the new PCW, such as A4 of PCWR, which is loaded in PQL and PQB (block 235). This results in the proper linkage between the previous last PCW, PCW2, with the new last PCW, PCW4, as well as in the proper updating of PQB. PCW2 in PCWR is restored in PSM 20 by the steps represented by blocks 236 and 237. These are followed by the steps in block 206 and those following it.

Figure 19:
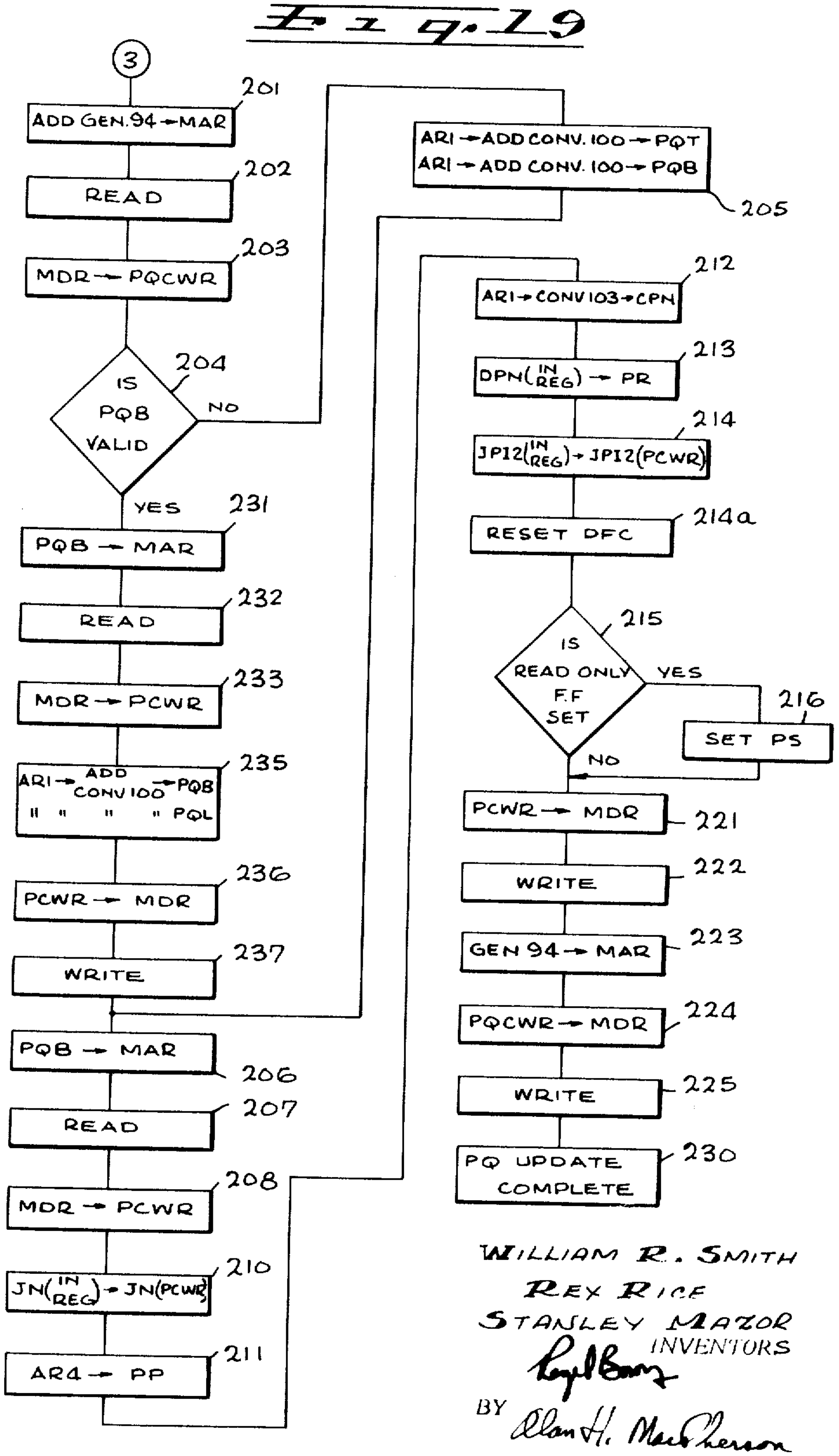

From the foregoing description it should thus be apparent to those familiar with the art that the flow charts of FIGS. 17–19 represent all the steps which are necessary to respond to a START signal when a paging request is received in order to interrogate the In-Core List and delete an appropriate PH word therefrom in accordance with the priority criteria, hereinbefore explained, as well as to add a PCW to the paging Q(PQ) with all the information which is necessary for both page pushing and/or page transferring as the case may be, which is required to perform the paging request. Referring to the example hereinbefore explained in connection with FIGS. 12 through 16, the steps in these flow charts represent all the steps necessary to change the In-Core List and the paging Q, shown in FIG. 12 to those represented in FIG. 13.

Figure 20:
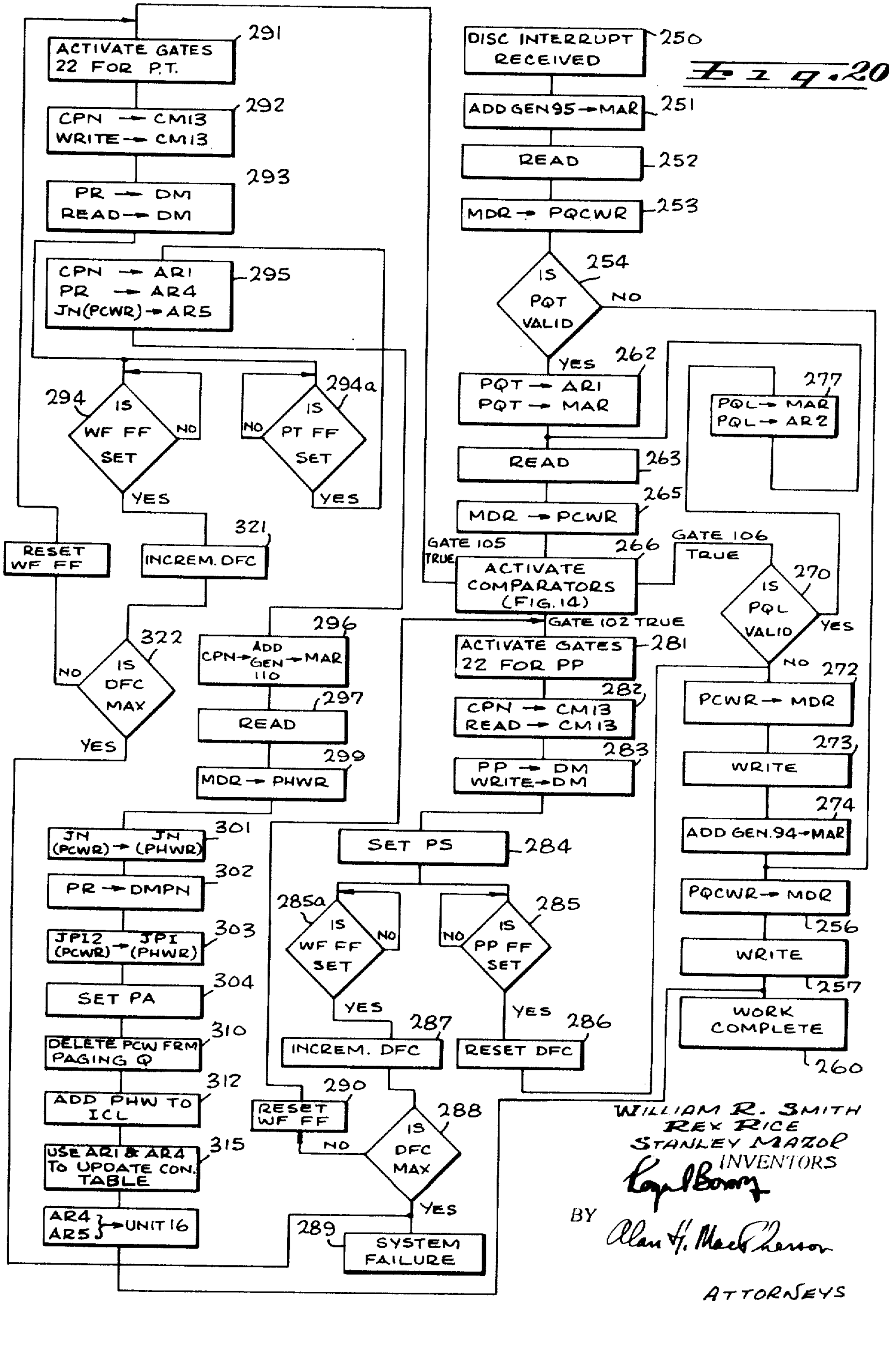

As hereinbefore explained each time a disc interrupt of a particular series in the DM is received, the paging Q is interrogated to determine whether there is any work such a page pushing or page transferring that can be performed in response to the particular disc interrupt. Reference is now made to FIG. 20 wherein block 250 represents that a disc interrupt has been received by the control section 85 (FIG. 11). Once received, the control section 85 supplies a sequence of control signals to generate the address A0, of PQCW (block 251), read out the word from SPM20 (block 252) and thereafter transfer PQCW from the MDR to PQCWR (block 253). Then the PQT field is interrogated (block 254). It is invalid if the PQ is completely empty. Consequently PQCW in the PQCWR is restored in SPM20 (blocks 256 and 257) and a Work Complete SIGNAL is produced as represented by block 260.

If however, in in interrogating PQT (block 254) the field is valid, thereby indicating that the PQ includes at least one PCW, the content of the PQT is transferred to AR1 as well as to the MAR (block 262). This is followed by a Read operation of the SPM20 (block 263) which in turn is followed by transferring the content of the MDR to PCWR (block 265). Thus, the top PCW in the PQ is now present in the PCWR. Then, the comparators shown in FIG. 14 are activated by a control signal from the control section 85 as represented by block 266 in FIG. 20.

As previously explained in conjunction with FIG. 14, the comparators provide one of three true outputs depending on whether in response to the particular disc interrupt a page-pushing operation can be performed, or a page transferring operation or whether neither operation can be performed. When gate 102 is true it indicates that a page-pushing operation can be performed, while a true output from gate 105 indicates that the page transferring can be performed. On the other hand, a true output from gate 106 indicates that neither page pushing, nor page transferring, can be performed for the particular PCW.

Assuming that the latter is the case, i.e., that gate 106 provides a true output, the PQL field of the PQCWR, which now stores a PQCW, is interrogated (block 270). If it is not valid, thereby indicating that the PCW is the last in the PQ, the PCW which is in PCWR is transferred to the MDR (block 272) and rewritten in memory (block 273). Then the control section 85 activates address generator 94 and loads the MAR (block 274) with the address A0 of the PQC word. This is followed by the step represented by block 256 and those following it.

If, however when PQL is interrogated (see block 270) it is found to be valid thereby indicating that there is a following PCW in the PQ, the content of PQL which holds the address of the next PCW in the PQ is transferred to AR1 and MAR (block 277). This is followed by the Read operation represented by block 263. Thus, successive PC words are retrieved from the memory and each one, when being in the PCWR, has its PS field together with the contents of its PP and PR fields interrogated or compared by the comparators, shown in FIG. 14, to determine whether any work can be done for the particular paging request, represented by the PC word.

Reference is again made to block 266. Assuming that the output of gate 102 is true, thereby indicating that a page-pushing operation can be performed for the particular PC word, the control section 85 (FIG. 11) supplies the page transfer gates 22 (see FIG. 1) with an activating signal, represented in FIG. 20) by block 281. This controls the gates 22 for a page-pushing operation in which the disc page from the core memory is read out and written or stored in its appropriate place in the DM12. Also, the CPN, representing the address of the core page from which the disc page is to be pushed out, is supplied to CM13 as an address, while a Read signal is also supplied to CM13, as represented in FIG. 20 by block 282. Furthermore, the control section 85 supplies controlling signals, as represented by block 283 to cause the transfer of the disc page number in the PP field, to the DM, as well as a Write signal to the DM. Thus, the two memories and the transfer gates 22 are activated to enable the disc page which is stored in one of the core pages to be pushed out therefrom and rewritten in the DM12.

While the page pushing takes place, the field PS in the PCWR is set, as represented by block 284 to indicate that for the particular paging request, represented by the PC word in the PCWR, only a page-transferring operation remains to be performed. After setting the PS field the status of two flip-flops assumed to be included among control flip-flops 107 (see FIG. 11) are interrogated (blocks 285 and 285*a*). These two FFs include a Page and Push (PP) FF and a Work Fail (WF) FF. The former is Page-Push Complete Signal from the disc controller supplied to the section 85 (see FIG. 11), when a page pushing operation is successfully completed. If, however, the page push operation or a page transfer operation fails, a Work Fail signal is received and the WF FF is set.

If the PP FF is set (block 285, FIG. 20) the DFC field of the PCWR is reset (block 286) and the system proceeds to the step represented by block 272. If, however, WF FF is set (block 285*a*), thereby indicating that the attempt to push a disc page into the DM failed, the DFC serving as a counter is incremented by one (1) (block 287). Then a determination is made (block 288) whether the count has reached a maximum selected number, which represents the maximum number of trials to be made before a System Failure signal is produced (block 289). If the count has not reached the maximum value, the WF FF is reset (block 290) and the steps represented by block 281 are repeated.

Reference is again made to block 266 in FIG. 20. If the comparators (see FIG. 14) cause gate 105 to be true, thereby indicating that a page transfer can be performed for the particular PC word, which is in the PCWR, the control section 85 activates gates 22 for a page transfer operation, as represented by block 291, while supplying the CP number, in the CPN of PCWR to CM13 as an address and a Write signal thereto, as represented by block 292. Also, the PR content, representing the disc page number to be transferred to the CM, is supplied to the DM together with a Read signal, as represented by block 293. This enables the two memories and the transfer gates 22 to cause a disc page to be read out, word by word, and passed through the transfer gates 22 for storage in the core page, whose number is supplied to the CM from the CPN.

Then WF FF and a Page Transfer (PT) FF are interrogated (blocks 294 and 294*a*). The latter is set by a Page Transfer Complete signal from the DM if the page transfer operation is successful. Thereafter, the content of CPN is transferred to AR1, the content of PR, representing the disc page which was transferred to the CM, is loaded into AR4, while the job number in the JN field of PCWR, representing the number of the job for which the page transfer to place, to AR5 (block 295). Then, (see block 296) the content of the CPN such as CP4, which is the number of the core page into which the disc page was transferred, is supplied to the address converter 100*a* which generates the address of the PH word, associated with the particular core page. This address is then supplied to the MAR. Once therein, a Read operation is performed (block 297) followed by the transfer of the PH word which is now in the MDR to PHWR (block 299).

Once the PH word, such as PHW4, of the particular core page into which a disc page was transferred, is in its corresponding working register, PHWR, various fields of PCWR are transferred thereto. That is, the number of the job for which the page transferring was performed, and which is in the JN of the PCWR is transferred to the JN of PHWR (block 301). Also, the content of PR, representing the disc page which was transferred to the core memory is loaded into the DMPN field of the PHWR (block 302), while the content of the JPI2 field of the PCWR is loaded into the JPI field of the PHWR (block 303). Furthermore, the PA field of the PHWR is set (block 304).

The last stage completes the transfer of the necessary information to the PH word, associated with the core page into which the disc page was transferred. Thus, the system is ready to delete the PCW from the paging Q and add the PHW to the In-Core List. The steps to be performed for deleting a PCW from the paging Q are analogous to those involved in deleting a PHW from the In-Core List, as hereinbefore described. Therefore, in FIG. 20 the deletion of the PCW from the paging Q is simply represented by block 310. Similarly, the addition of the PHW to the ICL is analogous to the addition of a PCW to the PQ. Therefore, the addition of the PHW to the ICL is represented in FIG. 20 by block 312.

Thereafter, the system uses the content of AR1 and AR4 to update the conversion table associated with the CM (block 315). At this point AR1 stores the core page number (CPN) into which the disc page has been transferred while AR4 stores the number of the disc page (DPN), which was transferred. Thus, the two are used to load the DPN into the field of the special-purpose word, associated with the particular core page. In the particular example hereinbefore used in connection with FIG. 9*c*, the number is DP326, which is loaded into the field of the special-purpose word, associated with CP2. The updating of the conversion table is represented in FIG. 20 by block 315.

Once the updating is completed, the content of AR4, representing the number of the job for which the paging transfer has been performed, as well as the content of AR4, representing the disc page which has been transferred, are supplied to the output register for supply to unit 16 which, initially requested the paging transfer. In FIG. 20, the supply of the JN and the disc page number (DPN) are represented by blocks 320. After the control unit is supplied with the JN and DPN, the paging transfer or work is completed.

If, however, when WF FF is interrogated it is found to be set (block 294, FIG. 20), the DFC is incremented (block 321) and the number in the DFC is checked (block 322). If it has reached the maximum number of transfer trails, the System Failure signal (block 289) is produced. If, however, the maximum number was not reached (block 322) the WF FF is reset (block 323) and the step represented by block 291 is repeated.

From the foregoing it should thus be appreciated that FIG. 20 diagrams all the steps which are necessary, in accordance with the teachings of the present invention, to respond to each disc interrupt which is received and to interrogate the paging Q to determine whether any work, namely whether any page pushing or page transferring can be performed for any of the paging requests, represented by the various PC words in the PQ.

It should be appreciated that the hardware in the paging control unit 10 (see FIG. 11) is used to respond to a START signal, received from the control unit 16, which represents the initiation of a paging request and which may involve the deletion of the PHW from the In-Core List and the addition of the PCW to the paging Q. It is also used in response to a disc interrupt which is received from the disc controller and which may result in the deletion of a PHW to the In-Core List. Thus, it is necessary to insure that once the circuitry, or hardware, is employed in response to one of the operation-initiating signals it is not interrupted by another of the signals until the operation is completed.

This may be achieved by further including two control flip-flops to insure that once an operation is initiated in response to one of the signals, such as the START signal the system's operation is not interrupted in response to a disc interrupt until the operation is completed. Similarly, if in response to a disc interrupt, which is received, the system starts its defined sequence of operation, this sequence is not interrupted in response to any START signal which may be received until the Work Complete signal (block 260 in FIG. 20) is produced.

From the foregoing description, and in particular, from the flow charts of FIGS. 17 through 20, it should be apparent to anyone familiar with the art, that various control signal generating techniques may be employed in the implementation of the control section 85 (FIG. 11) in order to control the transferring of the content of one or more fields of any one of the registers to any of the other registers as well as the retrieval of any of the control words from the SPN20 or the restorage of such control words therein. Although the number of steps which have to be performed is relatively great, since the step is performable in a very short time, the total time required for the performance of any of the operations is very short.

Figure 21:
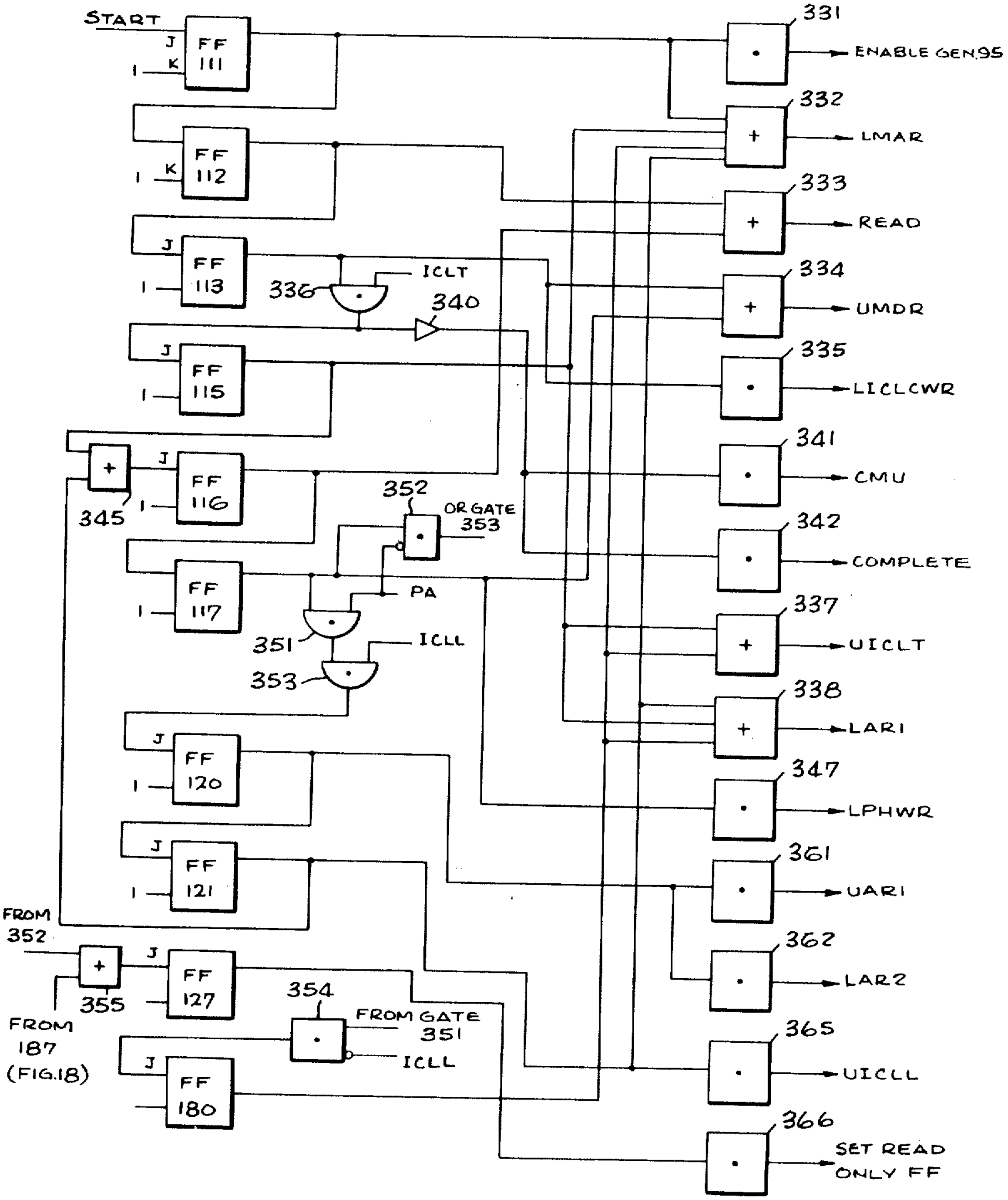
FIG. 21 is a block diagram of logic circuitry of the type which may be used to control the execution of the steps, shown in FIGS. 17 through 20.

One technique which may be employed in the implementaion of control section 85 to supply the various control signals, as hereinbefore explained may best be explained in conjunction with FIG. 21 to which reference is made herein. The latter figure is used to diagram one example of logic circuitry, necessary to generate the steps represented in FIG. 17 by blocks 110 through 121, as well as the steps represented by blocks 127 and 180. From this description, the circuitry necessary for the performance of the other steps will be apparent, and therefore will not be described in any further detail.

In FIG. 21 conventional logic designation is employed. That is, a block with a dot (·) in the center represents an AND gate, while a plus (+) sign in a block represents an OR gate. Single-input AND gates act as isolation gates. An input line with a little circle adjacent the block indicates that the inverted input is true. The various blocks, designated FF, are assumed to represent flip-flops of the JK type.

A JKFF is characterized by the following logical properties. If one assumes that $S_n$ is the state of the FF at clock period $n$ and $S_n{}^+{}_1$ is the state of the FF during the following clock period, $n$+1, the following rules dictate the state of the FF as a function of the J and K inputs.

| J | K | $S_{n+1}$ |
|---|---|---|
| 0 | 0 | $S_n$ |
| 0 | 1 | 0 |
| 1 | 0 | 1 |
| 1 | 1 | $\bar{S}_n$ |

In FIG. 21, k is always set to be a "1." With K set to "1," the FF will normally be "0." When the J becomes "1," the FF will change state for the next timing period and become a "1" when supplied with a clock pulse. This gives the basic Qn signal, which produces one or more control signals. While the FF "1," the J input normally goes to the "0" state, causing the state of the FF to return to the "0" state, during the next clock period.

As shown in FIG. 21, the START signal, which is received from the control unit 16 by the control section 85 (FIG. 11), is supplied to the J input of FF111. Consequently, when the next clock pulse is received FF111 is wet to provide a true or 1 output. This output enables an isolation gate 331, whose output represents an enabling signal for the generator 95. The true or 1 output of FF111 is also supplied to an OR-gate 332 whose output represents a Load signal to the MAR. The latter L, preceding the nomenclature MAR, designates a Load signal while a letter U, preceding a nomenclature represents an Unload signal. Thus while FF111 is a 1, the control section 85 provides two control signals which are necessary to provide the step, represented by block 111 in FIG. 17.

The one (1) output of FF111 is also supplied to the J input of FF112, so that when the next clock pulse is received it is FF112 that provides a true or 1 output. This output in addition to being supplied to the J input of a succeeding flip-flop FF113 is also supplied to an OR-gate 333 output represents a Read signal for SPM20. Thus, while FF112 is true, a Read signal is supplied by gate 333 of the control section 85 to enable the performance of the Read operation, represented by block 112 in FIG. 17.

During the next clock period FF113 is true. This output is supplied to an OR-gate 334, to provide an Unload MDR control signal, as well as to an isolation AND-gate 335, which provides a Load ICLCWR signal to the ICLCWR. Thus, the transfer of the content of the MDR to the ICLCWR is accomplished. The true output of FF113 is also supplied to one input of an AND-gate 336. The other input to this gate is provided from the activity bit, associated with the ICLT field in the ICLCWR. This bit is true whenever the ICLT contain a meaningful address. Thus, only when the ICLT is valid are both inputs to AND-gate 336 true, resulting in a true output to the J input of FF115. Consequently during the next clock period FF115 is true. This output is supplied to the OR-gate 332 to provide the LMAR control signal, as well as to an OR-gate 337 which provides an Unload ICLT signal and to another OR-gate 338, which provides a Load AR1 control signal. Thus, the signals necessary for the performance of the step, represented by block 115 in FIG. 17, are provided while FF115 is true.

If, however, the ICLT is not valid, the output of AND-gate 336 is false. Consequently, the output of an inverter 340 is true. When this output is true, an isolation AND-gate 341 is enabled to provide a CM Unavailable (CMU) signal, as well as to another isolation AND-gate 342, which provides a complete signal, which is analogous to the PQ complete signal, represented by block 230 in FIG. 19.

The output of FF115 is supplied to the J input of FF116 through an OR-gate 345. The other input to OR-gate 345 is supplied from the output of a FF121 so that FF116 is driven to a true or 1 state either after FF115 or FF121 is true. This is necessary since the Read step, represented in FIG. 17 by block 116 may have to be performed either after the performance of the steps represented by block 115, or after those represented by block 121. Assuming that FF116 is enabled after FF115 is true, the true or 1 output of FF116, in addition to being supplied to FF117 is also supplied to the OR-gate 333 to activate it in order to provide the necessary Read control signal.

When FF117 has a 1 output, it enables OR-gate 334 to provide an Unload MDR signal. It also enables an isolation OR-gate 347, whose output represents a Load PHWR control signal. The output FF117 is supplied to one input of each of AND-gates 351 and 532. The bit, associated with the PA field, is supplied to the other input of gate 351 while the complement of the bit is supplied to gate 352. The output of gate 351 is supplied to one input of an AND-gate 353 and to one input of an AND-gate 354. The bit, associated with the ICLL field is supplied to the other input of gate 353, while the complement of this bit is supplied to the other input of AND-gate 354. The output of gate 353 is supplied to the J input of a flip-flop 120, while the output of gate 352 is supplied to an OR-gate 355 whose output is in turn connected to the J input of a flip-flop 125. The output of gate 354 is connected to the J input of flip-flop 180.

It should be appreciated that when FF117 has a true output, if the bit associated with PA is true, i.e., PA is valid gate 351 provides a true output. Thus, if the ICLL is also valid, gate 353 also provides a true output, so that during the next clock pulse, FF120 is true, during which an Unload AR1 and a Load AR2 control signals are supplied by enabling isolation gates 361 and 362, respectively. Thus, the signals, necessary for performing the steps represented by block 120 in FIG. 17, are provided while FF120 is true. If on the other hand the output of AND-gate 352 is true, which is the case if the PA is not valid, during the next clock period FF127 is true. When the latter is true, it enables an isolation gate 363, whose output represents a Set Read-only FF control signal, thereby enabling the setting of the FF w which has to be performed after PA is found to be invalid, as represented in FIG. 18 by block 127. If on the other hand while the PA is active, the ICLL is not valid the output of gate 354 is true so that during the next clock period FF180 is set to true. When the latter is true it enables gate 337 to provide an Unload ICLT signal. It also enables OR-gates 338 and 333 to provide a Load AR1 signal and a Read-signal, respectively.

Assuming however that both the PA and the ICLL are valid, after FF120 is set to true, during which gates 361 and 362 are enabled, during the next clock period FF121 is true. It enables an AND-gate 365, whose output represents an Unload ICLL signal, while at the same time enabling OR-gates 332 and 338 to provide Load MAR and Load AR1 control signals, respectively. It should be pointed out that the output of FF121 is connected to one input of OR-gate 345 whose output is connected to the J input of FF116. This is necessary since after the period during which FF121 is true, FF116 has to be driven to a true state, in order to enable the OR-gate 333 to provide the Read control signal, necessary for the performance of the Read operation, which in FIG. 17 is represented by block 116.

This basic logic design technique may be extended to include additional flip-flops and gates to provide the necessary control signals for the performance of the other steps which are detailed in the flow charts, shown in FIGS. 17 through 20. Since from the description in connection with FIG. 21 the manner in which such flip-flops and gates should be interconnected, should be apparent to those familiar with the art, the additional flip-flops and gates will not be described. The steps diagrammed in FIGS. 17 through 21 should be regarded as representing actual hardware of the control section 85, necessary for the production of the various control signals, required for the performance of these steps.

As previously pointed out, in accordance with the teachings of the present invention, a situation may arise in which a disc page, which was transferred to the CM for one of the jobs, is no longer needed. In such a case, the control unit 16 may provide the PCU10 with the number of the disc page which is no longer required and with an Inactive-Core-Page signal. The latter initiates a sequence of steps which result in resetting the PA field of the PHW, associated with the core page in which the disc page is located. Once the PA field is set, the core page, associated therewith, may be thought of as being empty, since the disc page located therein is no longer needed. Thus, the particular core page may later be used to fulfill a page request without having to first push out the disc page therefrom.

Figure 22:
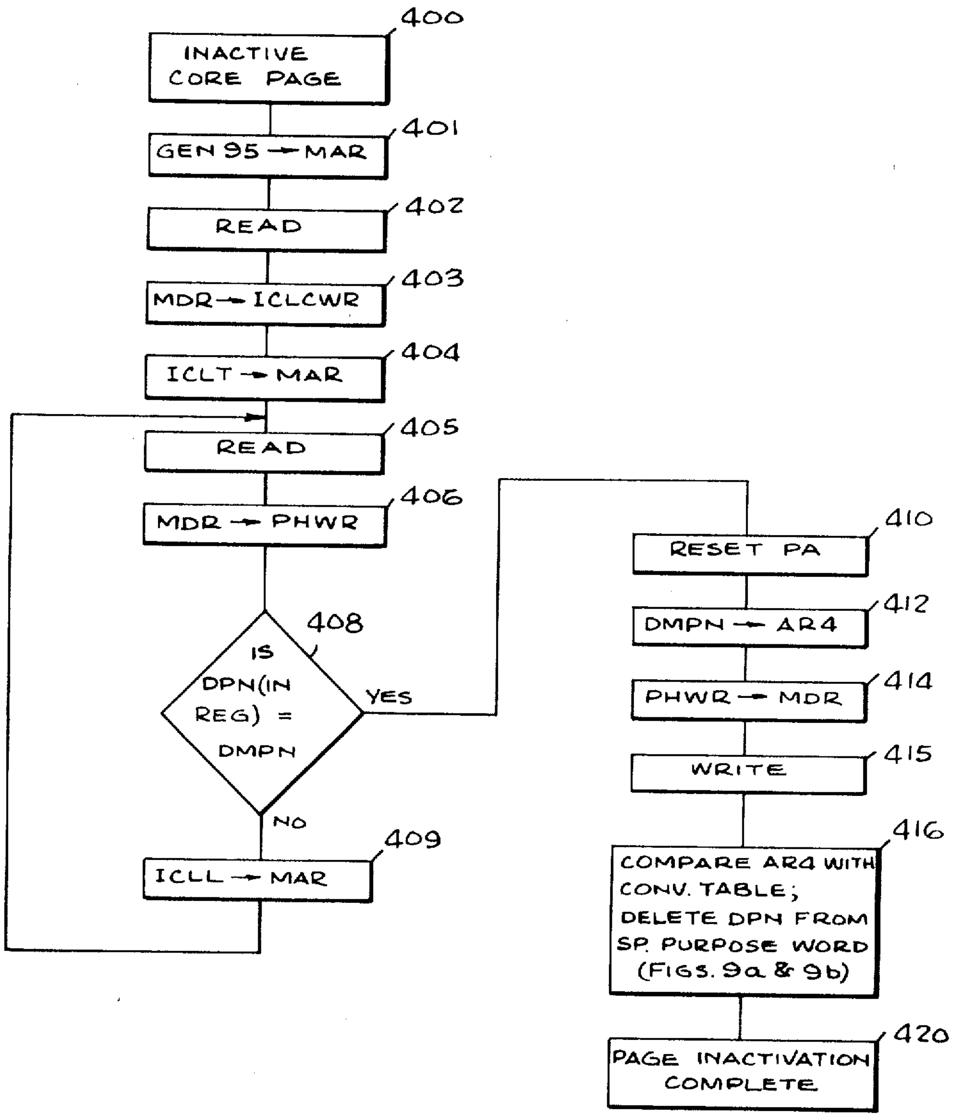
FIG. 22 is a flow chart, useful in explaining an additional novel feature of the present invention.

The sequence of steps necessary to reset the PA field of one of the PH words may best be explained in conjunction with FIG. 22 wherein block 400 designates an Inactive-Core-Page (ICP) signal, assumed to be received by the PCU10, together with a disc page number (DPN) which is loaded in the input register (see FIG. 11). Once the ICP signal is received, the ICLCW is retrieved and loaded into the ICLCWR (blocks 401–403). Then, the content of ICLT, which represents the address of the top PHW in the In-Core list is loaded in the MAR (block 404) and the top PHW is read out (block 405), and is loaded into the PHWR (block 406). Then, the disc page numbers in the DPN of the input register and DMPN of PHWR are compared (block 408). If they are not equal, the content of the ICLL, representing the address of a next PHW in the In-Core List, is loaded in the MAR (block 409), and the Read operation, represented by block 405 is repeated.

This process continues until DPN=DMPN (block 408). This occurs only when the PHW which is in the PHWR contains in its DMPN field, the number of the disc page which is no longer needed. Then, the PA field is reset (block 410) and the number in the DMPN is temporarily loaded in AR4 (block 412). Thereafter, the PHW with the reset PA field is restored in SPM20 (blocks 414 and 415). The content of AR4 which is the number of the disc page which is no longer needed may be used to modify the conversion table (block 416), as herebefore explained in conjunction with FIGS. 9*a* and 9*b*. Once this is accomplished a Page-Inactivation-Complete signal is produced, as represented by block 420.

The teachings of the present invention may be summarized as comprising a system for controlling the performance of paging requests, which may be received, by controlling the transferring of disc pages from a disc memory, or other like virtual memory, to an available core page in a much smaller core memory, an L.S.I. memory or the like. In accordance with the teachings of the present invention when a paging request is received, the request includes the number of the job (JN) for which the request is to be performed and the requested disc page (DPN). The request may further include one or more job priority indicators, such as JPI1 and JPI2. When more than one indicator is provided with the request, one of them, such as JPI1, may be used in the acquisition of a core page. Once a core page is acquired, into which the requested disc page is to be transferred, the second indicator, such as JPI2, may be used to indicate the holding priority of the requested disc page.

In accordance with the teachings of the present invention, control words are used to contain all the information which is necessary for the execution of the paging request, as well as the status of the various disc pages which are in the various core pages of the core memory. Each core page has associated therewith a special control word, herein referred to as a PH word, which is used to store the disc page number located in its corresponding core page, as well as the number of the job for which the disc page is located, and the holding priority of the page. These PH words are interlinked together by means of contents of selected fields (ICLL's) thereof to form an In-Core List which is pointed to by a special control word, herein referred to as the In-Core List word (ICLW).

When a request is received, the In-Core List is interrogated, as hereinbefore explained, to determine whether a core page is available into which the requested page should be stored. If all the core pages are loaded with disc pages, a determination is made which the disc page, if any, should be pushed out to make room for the requested page. Once a determination is made which core page should be emptied by pushing the disc page therefrom, a special-purpose control word, herein referred to as a PC word is added to a paging Q. The word which is added has a plurality of fields, which are used to contain all the information necessary for pushing the disc page, which has been selected for pushing, from the chosen core memory, as well as for all the information which is necessary for subsequently transferring the requested disc page into the core memory.

As each disc interrupt is received, the paging Q is interrogated to determine whether any work can be performed for any of the requests. As used herein, work refers to either pushing a disc page from one of the core pages to make room for a requested disc page therein, or the actual transferring of such a disc page into a core page which is in condition to receive a new disc page therein. Once the paging transfer has been completed, the PH word, associated with the core page into which the disc page has been transferred, is added to the In-Core List and the PC word which contained all the information necessary for the paging request is deleted from the paging Q.

The novel system of the present invention includes all the hardware which is necessary to automatically respond to either a paging request START signal or to a disc interrupt signal. Once either of the latter mentioned signals is received the hardware of the system of the present invention automatically performs sequences of steps depending on the status of various fields therein, to automatically execute the deletion or addition of a PH word from or to the In-Core List and/or the addition or deletion of a PC word to or from the paging Q. Thus, at any given time all the information which is necessary for the execution of an, of the paging request is present in the various special-purpose control words.

The system further includes all the circuitry necessary to reset a selected field of a PH word if the disc page, stored in a core page, associated with the particular PH word. This enables the page core to be used to satisfy a subsequent paging request, without having to push the disc page located therein back into the disc memory. The system further includes means to provide a System Fail signal if page pushing or page transferring cannot be completed after several trials.

Although particular embodiments of the invention have been described and illustrated herein, it is recognized that modifications and variations may readily occur to those skilled in the art and consequently it is intended that the claims be interpreted to cover such modifications and equivalents.

1. A method for controlling the transferring of pages of information within a computer having a first memory, and a second memory which is smaller and faster than said first memory, wherein each of said pages of information is associated with a page header word containing data pertaining to the job priority of the job being performed and data pertaining to the job priority of the job being performed and data pertaining to the page activity of such associated page, the method comprising:

assigning to each received page of information a job priority and a page activity indicator;

upon the detection by the computer of a page required to be stored in said second memory where no location for such storage is then available in said second memory, scanning the contents of a linked, nonsequential list of page header words, one after the next, until finding a page header word associated with a page of information of a predetermined low ranking, said ranking being obtained by a logical combination of the data in said page header word pertaining to said job priority and said page activity of the job and page, respectively, with which such header word is associated; and removing said low-ranking page and substituting therefor said page required to be stored.

2. The method of claim 1 further defined by said ranking also being based in part upon a comparison with a predetermined priority and activity of said page required to be stored.

* * * * *